US008599213B2

(12) United States Patent
DiVerdi et al.

(10) Patent No.: US 8,599,213 B2
(45) Date of Patent: Dec. 3, 2013

(54) SYSTEM AND METHOD FOR SIMULATING PAINT BRUSH STROKES USING CONFIGURABLE WETNESS, DRYING, AND MIXING PARAMETERS

(75) Inventors: Stephen J. DiVerdi, San Francisco, CA (US); Aravind Krishnaswamy, San Jose, CA (US); Jerry G. Harris, Newberry, FL (US); Sunil Hadap, San Jose, CA (US); Walter Michael Shaw, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 187 days.

(21) Appl. No.: 12/862,902

(22) Filed: Aug. 25, 2010

(65) Prior Publication Data

US 2013/0120435 A1    May 16, 2013

Related U.S. Application Data

(60) Provisional application No. 61/247,366, filed on Sep. 30, 2009.

(51) Int. Cl.
*G09G 5/02* (2006.01)
*G09G 5/00* (2006.01)

(52) U.S. Cl.
USPC ............ 345/594; 345/589; 345/581

(58) Field of Classification Search
USPC .......................................... 345/594
See application file for complete search history.

(56) References Cited

U.S. PATENT DOCUMENTS

| | | |
|---|---|---|
| 5,155,813 A | 10/1992 | Donoghue et al. |
| 6,329,990 B1 | 12/2001 | Silverbrook et al. |
| 6,801,211 B2 | 10/2004 | Forsline et al. |
| 6,870,550 B1 | 3/2005 | Schuster et al. |
| 7,079,153 B2 | 7/2006 | Derry et al. |
| 7,656,406 B1 | 2/2010 | Bartell et al. |
| 8,462,173 B2 | 6/2013 | DiVerdi et al. |
| 2002/0149600 A1 | 10/2002 | Van Splunter et al. |
| 2003/0161014 A1 | 8/2003 | Tobita et al. |
| 2006/0084039 A1 | 4/2006 | Ryokai et al. |
| 2007/0216684 A1 | 9/2007 | Hsu |

(Continued)

OTHER PUBLICATIONS

T. Cockshott, "Wet and Sticky: A Novel Model for Computer-Based Painting", doctoral dissertation, Glasgow University, Glasgow, Scotland, 1991.*

(Continued)

*Primary Examiner* — Ulka Chauhan
*Assistant Examiner* — Sae Won Yoon
(74) *Attorney, Agent, or Firm* — Wolfe-SBMC

(57) ABSTRACT

Systems, methods, and apparatus for simulating natural media painting in a digital painting application (or painting simulation module) may more accurately simulate real world painting techniques than conventional painting simulation applications. The digital painting application (or simulation module) may provide a small set of physically meaningful parameters (e.g., canvas wetness, drying rate, and pickup mix ratio). By setting the values of these parameters (or overriding default values for a selected paint type), the user may better control the appearance of brush strokes made by a virtual paint brush on a digital canvas. For example, the length of a brush stroke, the amount of streaking caused by paint picked up during the brush stroke, and/or the mix of paint deposited from a pickup buffer and a reservoir buffer of a brush model may be affected by changing the values of these parameters, thus allowing users to create different realistic painting effects.

19 Claims, 25 Drawing Sheets

(56) References Cited

U.S. PATENT DOCUMENTS

| | | | |
|---|---|---|---|
| 2007/0268302 A1* | 11/2007 | Hsu | 345/589 |
| 2007/0268304 A1 | 11/2007 | Hsu | |
| 2009/0157366 A1 | 6/2009 | Shin et al. | |
| 2011/0251829 A1 | 10/2011 | Baxter, III et al. | |
| 2013/0120394 A1 | 5/2013 | DiVerdi | |
| 2013/0120427 A1 | 5/2013 | DiVerdi | |
| 2013/0120436 A1 | 5/2013 | Krishnaswamy | |

OTHER PUBLICATIONS

Baxter, W.V.: "Physically-Based Modeling Techniques for Interactive Digital Painting." Ph.D. thesis, University of North Carolina at Chapel Hill, Department of Computer Science (Jun. 2004).*

Steve Strassmann. 1986. Hairy brushes. SIGGRAPH Comput. Graph. 20, 4 (Aug. 1986), 225-232.*

William Valentine Baxter III. Physically-based Modeling Techniques for Interactive Digital Painting. PhD thesis, University of North Carolina, 2004, 269, June.

"ArtRage Product Line Feature Comparison.", downloaded from http://www2.ambientdesign.com/files/artrage_product_comparison.pdf on Aug. 24, 2010, 4 pages.

"Corel Painter 11", retrieved from <http://www.corel.com/content|painter11/compare/Painter11_Family_Product_Matrix.pdf> on Aug. 24, 2010, 2 pages.

"Corel Painter IX", *Corel Painter IX User Guide*, Copyright 1991-2004 Corel Corporation, (Aug. 2004), 9 pages.

"Final Office Action", U.S. Appl. No. 12/862,927, (Dec. 11, 2012), 27 pages.

"Non-Final Office Action", U.S. Appl. No. 12/862,879, (Nov. 20, 2012), 15 pages.

"Non-Final Office Action", U.S. Appl. No. 12/862,913, (Aug. 1, 2012), 13 pages.

"Non-Final Office Action", U.S. Appl. No. 12/862,927, (Jul. 31, 2012), 21 pages.

Hang, Chu S., "Making Digital Painting Organic", *PhD Thesis, Hong Kong University of Science and Technology*, (Aug. 2007), 126 pages.

Van Laerhoven, Tom "An Extensible Simulation Framework Supporting Physically-based Interactive Painting", *PhD thesis, University of Limburg*, (Jun. 21, 2006), 171 pages.

"Final Office Action", U.S. Appl. No. 12/862,913, (Feb. 14, 2013), 16 pages.

"Notice of Allowance", U.S. Appl. No. 12/862,879, (Mar. 21, 2013), 7 pages.

"Supplemental Notice of Allowance", U.S. Appl. No. 12/862,879, (May 20, 2013), 2 pages.

"ArtRage 2.5", *User Manual, Ambient Design, Ltd.*, (2007), 82 pages.

"Non-Final Office Action", U.S. Appl. No. 12/862,927, (Jul. 18, 2013), 17 pages.

"Notice of Allowance", U.S. Appl. No. 12/862,913, (Sep. 20, 2013), 16 pages.

* cited by examiner

SYSTEM AND METHOD FOR SIMULATING PAINT BRUSH STROKES USING CONFIGURABLE WETNESS, DRYING, AND MIXING PARAMETERS

PRIORITY INFORMATION

This application claims benefit of priority of U.S. Provisional Application Ser. No. 61/247,366 entitled "Methods and Apparatus for Simulating Natural Media Painting in Digital Media" filed Sep. 30, 2009, the content of which is incorporated by reference herein in its entirety.

BACKGROUND

Description of the Related Art

One component of the simulation of real natural media paint is the method by which paint moves between the brush and the canvas. There are a number of highly visible effects that depend on this interaction, and in order to provide a high-fidelity recreation of real paint strokes, this interaction should be accurately reproduced. Real natural paint media with thick paints such as oil paints, acrylics, gouache, etc., exhibit a variety of different behaviors that are important aspects of how painters achieve their results. Many of these behaviors come from the fact that paint deposition by a brush on a canvas is not a one-way transfer—that is, paint is moving from the brush to the canvas and from the canvas to the brush at the same time. This results in the dirtying of strokes as a brush passes through wet paint on the canvas. However, this allows painters to create smooth transitions between colors by gradually mixing two or more colors of paint with via pickup and deposition of small amounts of paint back and forth. Another effect of real natural media painting is the drying out of the paint on the brush during a stroke, which may result in streaky marks.

Baxter describes an oil paint simulation technique in his PhD thesis (William Valentine Baxter III. *Physically-based Modeling Techniques for Interactive Digital Painting*. PhD thesis, University of North Carolina, 2004). In this technique, paint on a brush is modeled using two layers, a reservoir and a surface layer. Baxter's model dictates that paint flows between the surface and the canvas, and from the reservoir to the surface (as illustrated in FIG. 1). By this method, the surface could become dirty from the canvas, but could also be replenished by the reservoir, which could eventually run out of paint to cause dry strokes. However, a limitation of Baxter's technique is that paint moves between the layers with a constant flow rate. In other words, using Baxter's technique, the picked up paint always makes the same length of dirty stroke, regardless of how much paint is actually picked up. For example, if a small amount of red paint is picked up by a white paint loaded brush, the brush makes a reddish streak of some length, whereas if a much larger amount of red paint is picked up, the brush makes the same length of reddish streak.

When a physical paint brush is used to paint on canvas, the length of stroke is determined by how quickly the paint on the brush dries (e.g., by being deposited on the canvas). If there is paint already on the canvas, the extent to which the paint on the canvas mixes with the paint on the brush is determined by how wet the paint on the canvas is and how wet the paint on the brush is. Conventional painting simulation tools attempt to reproduce some of these effects by ad-hoc methods such as arbitrarily modulating the opacity of the deposited paint either spatially or temporally. However, these conventional painting simulation tools typically do not mix or blend the colors on the canvas with the colors in the brush. In addition, conventional painting simulation tools do not provide intuitive methods to control the manner in which the colors are mixed or the length of stroke that can be made.

Physical paint brushes have paint loaded onto them as the painter pushes and rotates the brush either onto a canvas or onto a color palette. As the paint on the canvas is often not all the same color, the physical paint brush may have paint of different colors loaded non-uniformly among and along each of the bristles. To replicate this physical workflow digitally, a painting simulation tool should provide:

the ability to specify non-uniform colors across a static tip;
the ability to specify non-uniform colors across the various bristles on a physically-based bristle brush; and
the ability to specify non-uniform colors along a bristle on a physically-based bristle brush.

These requirements add complexity to the workflow of a digital brush and make unclear the requirements of an ideal user interface mechanism that would both allow the organic experience of using a real paint brush and provide the flexibility of a digital paint brush. Conventional user interface (UI) methods in painting simulation tools may allow a user to specify a single color for a brush, or to specify a gradient or ramp along the length of a bristle. Some of these conventional methods may also allow the user to specify color for each bristle separately. However, in conventional painting simulation tools, these options tend to be difficult to use, non-intuitive to the user, and counter to the organic feeling of painting. Furthermore, these conventional methods are not consistent when trying to load a static-tipped virtual brush as compared to a physically-based bristle brush, leading to user confusion.

A real media (physical) paint brush has many complex behaviors. For example, during painting, the brush will run out of paint and will get dirty. These behaviors are important for creating realistic paint effects, but in many cases, these behaviors are annoyances that must be worked around. Common natural media painting tasks include painting "fresh" strokes (e.g., painting with a full, clean load of paint), painting dirty strokes, and blending colors with a clean brush. Each of these workflows requires managing the paint loaded on the brush between consecutive strokes. To paint fresh strokes, the brush must be cleaned (dipped in turpentine or water) and reloaded with paint from the palette between each pair of brush strokes. To paint dirty strokes, the brush must be reloaded with paint from the palette (but not cleaned, so the load is inhomogeneous) between brush strokes. To blend colors with a clean brush, the brush must be cleaned between brush strokes to remove the accumulation of picked up paint.

Painters using conventional, natural paint may develop techniques for cleaning and loading physical paint brushes quickly and without losing focus on their artwork, but these reflexive actions take years to develop. Conventional digital painting applications may focus on providing specific tools that each model a specific behavior a painter may want, such as a "blending colors" tool and a "clean paint" tool. However, conventional digital painting applications generally model only real painting tools, and require users to manually reproduce the actions a real painter may perform to achieve the desired effects. Conventional digital painting applications may create individual tools to reproduce each specific type of painting effect a user may want, which may result in a myriad of tools, each of which must be learned and managed in turn. Most users only make use of a small percentage of the available tools in these conventional digital painting applications, and thus may be limited in the types of effects that they are able to create.

Conventional painting simulation engines may focus on reproducing the experience of real natural media painting, and may provide a very small number of tools (generally just a virtual paint brush) and focus on enabling many effects with that single tool. However, this approach may require the user to perform a significant amount of manual work for common painting tasks, just as with real natural media painting. This creates a serious usability obstacle for novice users.

SUMMARY

Various embodiments of systems, methods, and apparatus for simulating natural media painting in a digital painting application (or simulation module thereof) are described. The methods described herein may be more intuitive for the artist, and also more easily learned by the novice, than techniques implemented in conventional painting simulation engines. These methods may allow the user to more accurately simulate real world painting techniques than the models employed in conventional painting simulation applications.

In some embodiments, the digital painting application (or painting simulation module) may employ a two-layer model of a virtual paintbrush. The two-layer brush model may include a reservoir buffer and a pickup buffer to separately represent the paint stored in the belly of a paint brush tip and paint that has been picked up on the surface of the brush tip during a brush stroke, respectively. Each element in the reservoir buffer and the pickup buffer may store data indicating a paint color, an amount of paint, and/or other properties of the paint stored in a respective portion of the virtual brush. The two-layer brush model may also include methods that automatically control how virtual paint moves between these layers and a digital canvas in response to receiving input defining a brush stroke made by a virtual brush. The two-layer model and paint moving methods, which may be referred to collectively as a paint load model, may enable a more accurate reproduction of realistic brush strokes in painting simulation than is provided by conventional methods.

In some embodiments of the paint load model, paint does not flow from the reservoir to the pickup, as in conventional methods. Instead, in simulations that employ the two-layer brush model described herein, virtual paint may be deposited on the digital canvas directly from either or both of the buffers. This may allow the simulation to more realistically mimic the behavior of a physical paint brush stroke, such as when a physical paint brush picks up paint when it passes over a canvas on which at least some of the paint is still wet.

In some embodiments, paint picked up by the virtual brush during a brush stroke may be streaked over the canvas during the brush stroke or during a subsequent brush stroke, and may be mixed with paint already in the pickup buffer when added to the pickup buffer. In some embodiments, the digital painting application (or simulation module) described herein may compute the resulting color and amount of paint stored in an image pixel on a digital canvas that is affected by a brush stroke by mixing virtual paint from both the pickup buffer and the reservoir buffer to compute the color and amount of virtual paint to be deposited by the virtual brush during the brush stroke and/or by mixing virtual paint to be deposited by the virtual brush during the brush stroke with virtual paint that was previously deposited on the digital canvas.

In some embodiments, the digital painting application (or simulation module) may provide a relatively small and physically meaningful set of parameters to control the behavior of various brush strokes. For example, in some embodiments, the digital painting application (or simulation module) may provide a canvas wetness parameter, a drying rate parameter, and/or a pickup mix ratio for a virtual brush. In response to receiving input defining a brush stroke made on a digital canvas by the virtual brush, the digital painting application may apply a brush stroke whose effects are dependent on the values of one or more of these parameters. In some embodiments, one or more of the parameter values may be a default value for a given paint type. In some embodiments, the value of one or more of the parameters may be configurable by a user.

In some embodiments, the value of the drying rate parameter may be set or adjusted in order to affect the length of one or more brush strokes applied to a digital canvas using the virtual brush. For example, a shorter brush stroke may be produced when the drying rate value is high than when the drying rate value is low.

In some embodiments, the value of a canvas wetness parameter may be set or adjusted to affect the amount of paint that is picked up from the canvas by one or more brush strokes and eventually mixed with paint on the brush and/or streaked on the canvas. For example, if the canvas wetness parameter value is low, relatively little paint may be picked up from the canvas, resulting in a small amount of streaking If the canvas wetness parameter value is higher, more paint may be picked up from the canvas, resulting in a larger streak than one made when the canvas wetness parameter is low.

In some embodiments, the value of a pickup mix ratio parameter may be set or adjusted to affect the extent to which paint picked up from the canvas by the brush during a brush stroke is mixed with other paint on the brush when being re-deposited on the canvas during the brush stroke. For example, assuming a high canvas wetness value, if the pickup mix ratio value is high, the brush stroke may primarily streak the picked up paint from the canvas. If the pickup mix ratio value is low, the color on the brush may be blended with the paint picked up from the canvas paint; and then the blended paint may be streaked on the canvas.

In embodiments in which a virtual brush is modeled using a brush model that includes a reservoir buffer and a pickup buffer, more paint from the reservoir buffer may be forcibly mixed with the virtual paint picked up from the digital canvas when the pickup mix ratio value is high than when the pickup mix ratio value is low. In embodiments in which a virtual brush is modeled using a bristle brush model, data for two or more bristles of the bristle brush model may indicate values of one or more of the drying rate parameter, the canvas wetness parameter, and the pickup mix ratio that are different.

In some embodiments, the digital painting application (or simulation module) may allow the user to load a brush with non-uniform colors by directly sampling the digital canvas on which they are painting. In some such embodiments, the reservoir buffer may be loaded with the selected color(s) according to the non-uniform distribution of colors in the sampled portion of the digital canvas.

In some embodiments, the digital painting application (or simulation module) may provide an automatic brush cleaning feature and an automatic brush filling feature, which may be separately selectable by a user. When enabled, these features may cause the digital painting application (or simulation module) to automatically clean the virtual brush (e.g., by emptying both the reservoir buffer and the pickup buffer) and/or automatically fill the virtual brush with paint (e.g., by storing data representing paint in the reservoir buffer) between brush strokes.

Various embodiments of the digital painting applications and/or painting simulation modules described herein may implement one or more of the above methods, parameters, options, or features. Moreover, a given painting operation using the digital painting applications and/or painting simulation modules described herein may employ two or more of the above methods, parameters, options, or features, in various combinations, to achieve a variety of painting simulation effects and to provide various painting simulation functionalities.

Figure 1:
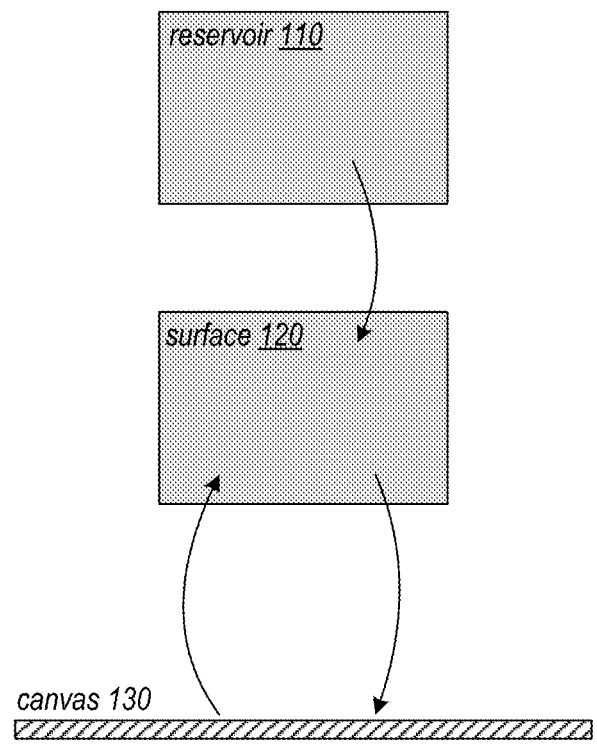
FIG. 1 illustrates a prior art oil painting simulation technique in which paint on a brush is modeled using two layers.

While various embodiments are described herein by way of example for several embodiments and illustrative drawings, those skilled in the art will recognize that embodiments are not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 25:
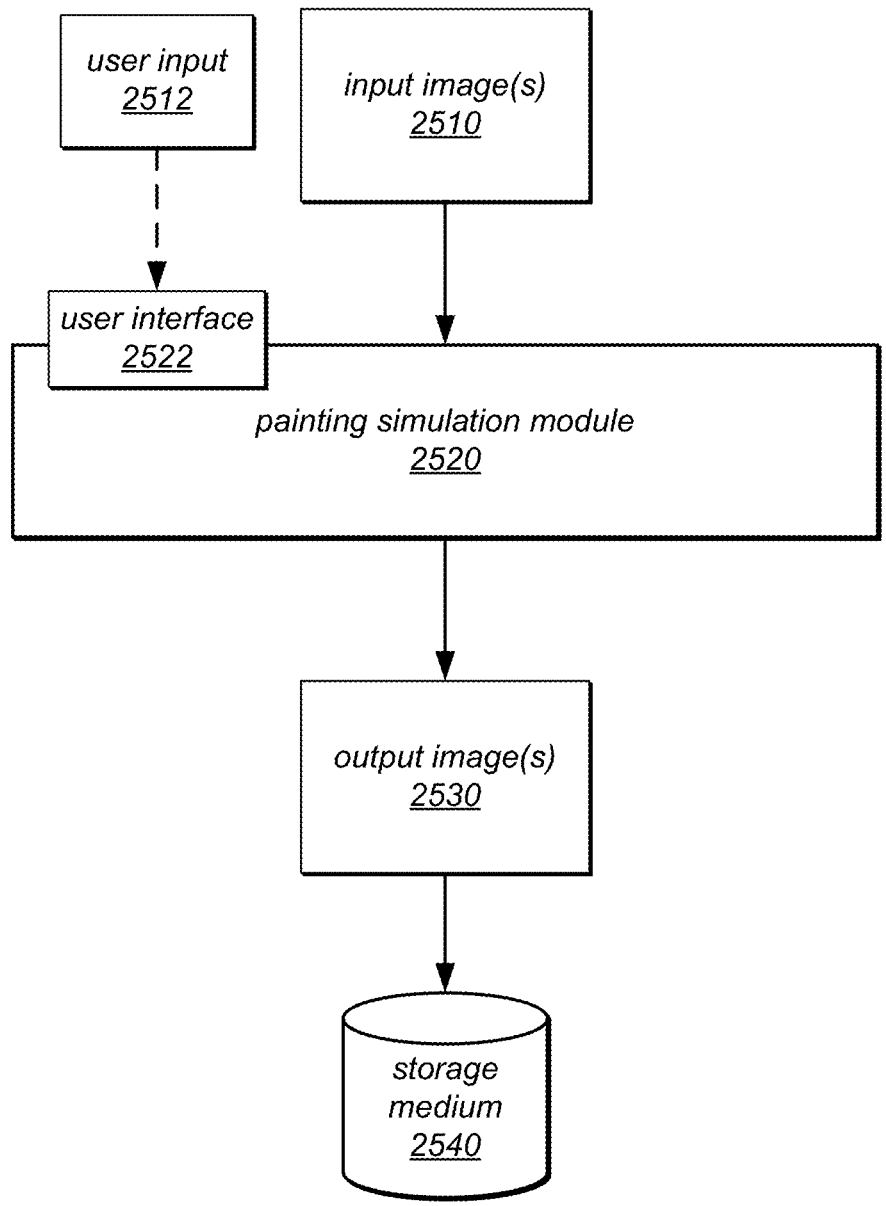
FIG. 25 illustrates a painting simulation module that may implement one or more of the painting simulation methods described herein, according to some embodiments.
Figure 26:
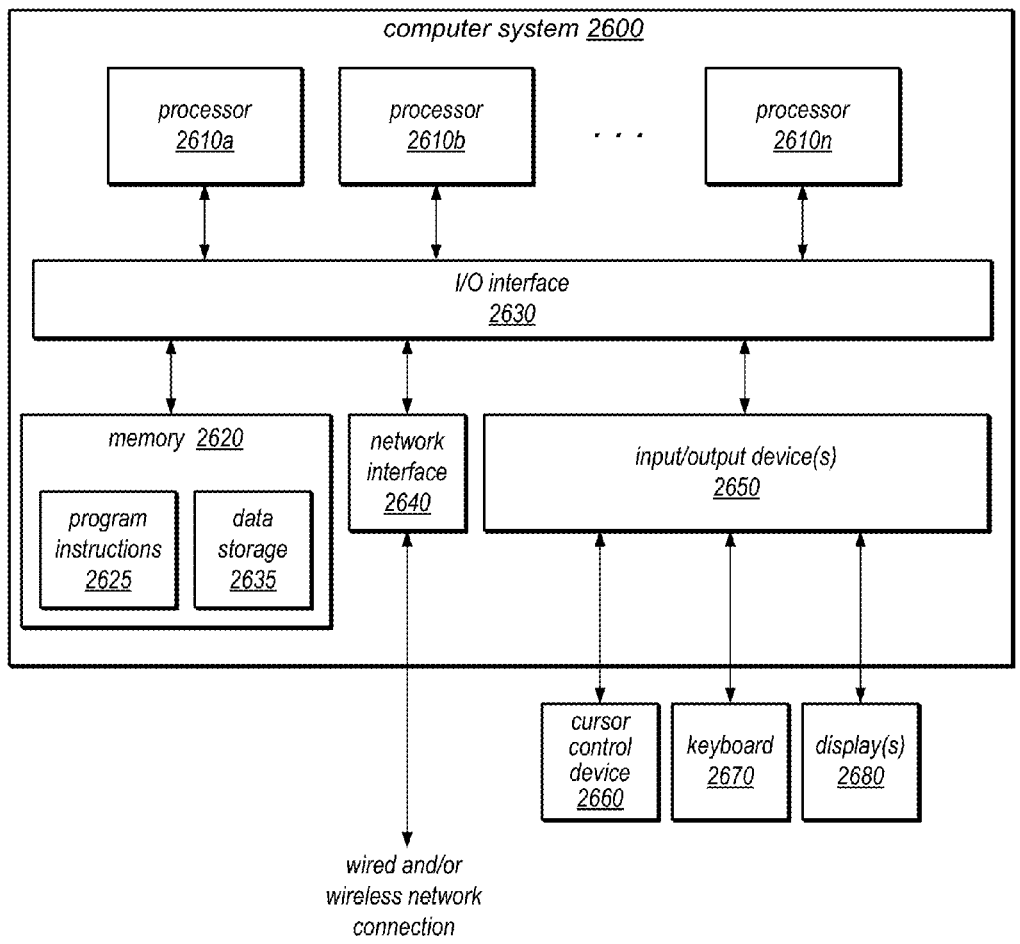
FIG. 26 illustrates one embodiment of a computer system that is configured to implement one or more of the painting simulation methods described herein, according to some embodiments.

Various embodiments of systems, methods, and apparatus for simulating natural media painting in digital media are described herein. In some embodiments, the methods described herein may more accurately and/or realistically simulate real (i.e. physical) painting techniques than conventional painting simulation engines. These methods may be more intuitive for the artist, and also more easily learned by the novice, than techniques implemented in conventional painting simulation engines. One or more of the methods described herein may be implemented, for example, in a stand-alone painting simulation application (such as a natural media painting simulation application) or in a painting simulation module of a digital painting application or another type of graphics application. For example, a painting simulation module or digital painting application may present a user interface for receiving input from a user specifying values of one or more parameters to be applied in a digital painting operation, one or more paint loading or paint deposition modes, and/or one or more digital painting operations, may model paint loaded on a virtual brush using both a reservoir buffer and a pickup buffer, may deposit paint onto a digital canvas directly from the reservoir buffer and/or the pickup buffer, may provide a mechanism by which a non-uniform distribution of paint can be loaded onto a virtual brush, and/or may provide automatic brush cleaning and/or automatic brush filling to simplify some digital painting workflows, in various embodiments. One such painting simulation module is illustrated in FIG. 25 and described in detail below. An example system on which various embodiments of a painting simulation module and/or one or more of the methods described herein may be implemented and executed is illustrated in FIG. 26 and described in detail below.

As previously noted, one component of a simulation of real natural media paint is the method by which paint moving between the brush and the canvas is modeled. Some embodiments of the painting simulation applications described herein may implement a two-layer brush model that separately stores data representing the paint stored in the belly of a brush tip, and the paint that has been picked up on its surface, using a reservoir buffer and a pickup buffer. In such embodiments, the painting simulation application may include methods that automatically control how paint moves between these layers and the canvas, and this behavior may be dependent on the values of one or more configurable parameters. The two-layer brush model and corresponding paint deposition method, which may be referred to collectively as a paint load model, may enable a more accurate reproduction of realistic brush strokes in painting simulations than that provided by conventional methods. In some embodiments of the paint load model, paint may be directly deposited on a canvas from both the pickup layer and the reservoir layer, as described in more detail below.

Note that, as used herein, the term "brush stroke" (or simply "stroke") may refer to an action of a physical paint brush or a corresponding mark made by an action of a physical paint brush, or may refer to an action of virtual brush or a corresponding mark made on a digital canvas by an action of a virtual brush. In various embodiments, a virtual brush stroke may be defined by manipulation of an input/output device (such as a cursor control device, including a mouse, a touch pad, a button, a stylus on a tablet, a track ball, or another suitable input/output device). For example, a virtual brush stroke may be defined in terms of the actions taken from "mouse down" to "mouse up", or from the "click" of a cursor control mechanism to the "release" of that mechanism, in different embodiments. Note also that, as used herein, the term "virtual paint" may refer to a digital representation of physical paint in a digital painting application or painting simulation module, and this digital representation of physical paint may alternatively be referred to simply as "paint" in the context of such a digital painting application or painting simulation module. Similarly, the terms "virtual brush" and "brush" may both be used to refer to a digital representation of a physical paint brush in a digital painting application or painting simulation module.

In some embodiments that include the two-layer paint load model described herein, the rate at which paint is deposited from the pickup buffer may be different from the rate at which paint is deposited from the reservoir buffer. In some embodiments, the ratio of paint deposited from each of the buffers may be dependent on the values of one or more configurable parameters, as described herein. As used herein the term "brush flow rate" may refer to the rate at which paint is deposited on a digital canvas by a virtual brush, whether that paint includes paint from the pickup buffer, the reservoir buffer, or a mix of the two. The term "pickup flow rate" may refer to the rate at which paint is picked up from a digital canvas by a virtual brush during the application of a brush stroke. The brush flow rate may be used in the painting simulation application in determining how much paint is deposited over time and/or space by a given brush stroke, and may also influence how long a brush stroke can be, how long the paint in the brush lasts, how long smears made by picked up paint can be, etc. In different embodiments, the values of the brush flow rate and/or the pickup flow rate may be configurable by a user, may be pre-defined for a particular paint or paint type, or may be a default value (which it may be possible to override). As when a brush stroke is painted with a real (physical) paint brush, when a brush stroke is applied to a digital canvas, paint may be picked up from the canvas and mixed with paint loaded on the virtual brush (e.g., in the reservoir buffer) and/or other paint previously picked up by the virtual brush (e.g., in the pickup buffer), and this mixture of paint may be subsequently deposited on the canvas where it is further mixed with paint already present on the canvas.

Using a previous painting simulation technique in which paint flows between a surface layer and the canvas, and from a reservoir layer to the surface layer, if 10 units of white paint are stored in the surface layer and the brush passes over an area of red paint, picking up one unit of red paint, the paint subsequently deposited by the brush may appear as a light pink color for the rest of the stroke. In other words, the color of each of the 10 units of paint on the brush may be modified so that it is 1 part red and 10 parts white. However, a more realistic result, which may be provided by a system in which the paint stored in a brush is modeled using a pickup buffer and a reservoir buffer, as described herein, may be that a small amount of red paint (or paint that is predominantly red) is smeared out over the canvas for a short distance after it is picked up, and then white paint (or paint that is predominantly white) is deposited for the rest of the brush stroke. In such a system, a small amount of red paint picked up by the brush during the stroke may be stored separately (e.g., in a pickup buffer) from the large amount of white paint (e.g., in a reservoir buffer), and paint from the two buffers may be deposited during the remainder of the stroke at the same or different flow rates, thus depleting the two buffers at the same or different rates. If the brush picked up a larger amount of red paint, the system described herein may produce a brush stroke in which red paint is smeared over a larger distance before the paint deposited by the brush returns to a white color.

Figure 2:
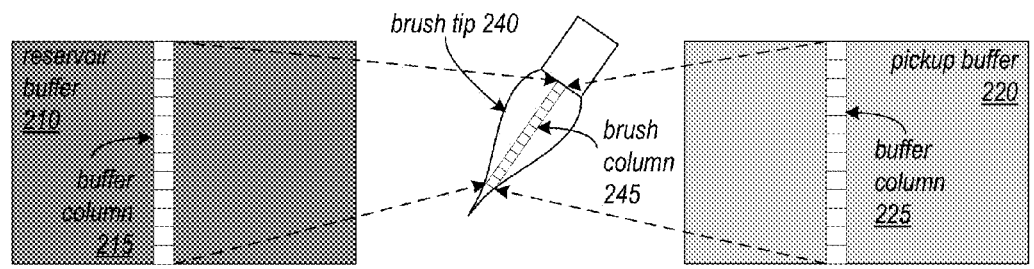
FIG. 2 illustrates one embodiment of a painting simulation technique that uses a reservoir buffer and a pickup buffer to model paint on a brush, and in which cells in both buffers correspond to a particular cell on the brush.
Figure 3:
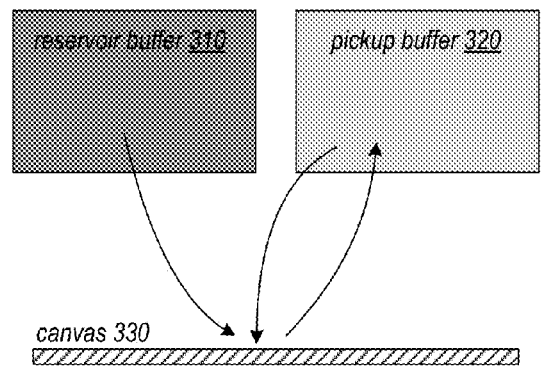
FIG. 3 illustrates one embodiment of a painting simulation technique that uses a reservoir buffer and a pickup buffer to model paint on a brush, and in which both buffers directly deposit paint on to the canvas.

As illustrated in FIGS. 2 and 3, in some embodiments the paint load state of a brush tip (e.g., the amount, type, and/or color of paint on the brush tip at a given point in time) may be represented using two buffers, which may be referred to as a reservoir buffer and a pickup buffer. These two buffers may be similarly mapped onto the brush so that each unit area of the brush tip corresponds to one cell of the reservoir buffer and one cell of the pickup buffer. FIG. 2 illustrates one embodiment of a painting simulation technique that uses a reservoir buffer and a pickup buffer to model paint on a brush, and in which cells in both buffers correspond to a particular cell on the brush. In this example, the paint load state of a portion of brush tip 240 is represented by values in buffer column 215 of reservoir buffer 210, and in buffer column 225 of pickup buffer 220. Specifically, each cell of brush column 245 is mapped to a respective cell of buffer column 215, and is also mapped to a respective cell of buffer column 225, and the values in each cell of buffer column 215 and buffer column 225 reflect the color and/or other properties of the paint loaded on the portion of brush tip 240 represented by the corresponding cells of brush column 245.

When paint is deposited on a digital canvas from brush tip 240, the paint deposited by each portion of brush tip 240 may be deposited from corresponding cells in reservoir buffer 210 or pickup buffer 220, or the paint deposited on the digital canvas may be a mix of paint from corresponding cells in both reservoir buffer 210 and pickup buffer 220, as described herein. In various embodiments, brush tip 240 may represent a physical paint brush as a simple 2D stamp of pixels (e.g., a collection of pixels forming a circle, rectangle or other shape), a 3D mesh, 3D bristle strands, or some other representation, and the paint load model described herein may be applied to any of these brush models. In other words, the paint load model described herein may not depend on having any particular mapping of the brush model to the reservoir and pickup buffers, as long as some such mapping is defined.

In some embodiments, the pickup and reservoir buffers may be mapped to a virtual brush tip modeled as a set of bristles on a bristle brush in which the set of bristles may change shape and orientation over time during a stroke. The pickup and reservoir buffers may be associated with the bristles in the brush tip to create a mapping that is more sophisticated for this bristle brush case than the mapped used with a conventional static brush model (such as a 2D stamp-based brush model). In some embodiments, each bristle in the brush tip may correspond to a respective column in each of the two buffers. The model for each bristle may include a plurality of cells for holding paint values, and each column in each of the two buffers (i.e. the pickup buffer and the reservoir buffer) may also include a plurality of cells. Each cell in a bristle model may correspond to a particular cell in the respective column of each of the buffers, and different cells may store paint having different colors and/or other properties. Thus, there may be variations in the color and amount of paint stored along a bristle during a stroke. For example, when the brush is loaded from a palette, the reservoir buffer may be completely filled. As the brush is stroked on the digital canvas, paint may be picked up off the canvas and added to the pickup buffer, and paint may (at the same time) be deposited from the pickup buffer and the reservoir onto the canvas. In embodiments that employ a bristle brush model, different cells along a bristle, and different bristles, may come into contact with different portions of the canvas. Thus, paint is picked up and deposited according to the location of the cells of the bristles that are in contact with the canvas and according to the contents of the buffers in locations corresponding to the cells of the bristles. This bristle brush configuration may allow paint to be deposited on the canvas in a natural, streaked manner, as described in more detail below.

As previously noted, the reservoir buffer may store data representing the volume of paint stored in the belly of the brush tip, which may be filled, for example, when the brush is placed into an ink well or into paint on a palette. In a digital painting application, this could be considered to be the set color of the brush. In this example, each cell of the reservoir buffer may store a single color of paint along with an amount of paint. The amount may represent how much paint is stored at that location in the reservoir buffer, and therefore, how much paint can be deposited on the digital canvas from that location. In some embodiments, the data representing the amount of paint is stored in units of pixels. In other words, a reservoir buffer cell that stores a value of 500 for the amount of paint may be able to mark 500 pixels on the digital canvas before it is depleted (empty). Other embodiments may use other methods of storing and mapping the amount of paint in the reservoir buffer.

As previously noted, the pickup buffer may store data representing the paint that the brush has picked up (e.g., wicked up) from the canvas during the application of a brush stroke. For example, if a clean brush is dragged through wet paint during a brush stroke, wet paint from the canvas may be picked up by the brush tip and then subsequently deposited at another point in time during the stroke. In some embodiments, the data stored in the pickup buffer represents this quantity of paint that is picked up during a stroke. In some embodiments, the pickup buffer stores, per cell, a color and an amount of paint in pre-defined units (e.g., in pixels) similar to data stored in the reservoir buffer and described above. In some embodiments, the pickup buffer may have a smaller capacity than the reservoir buffer, as the volume of the belly of a brush tip is typically larger than the volume of the surface of a brush tip that picked up paint can occupy. Note that, in some embodiments, the reservoir buffer may be more likely to store paint of a single (uniform) color and/or paint type in each column and/or along each bristle, while the color and/or other properties of the paint stored in the pickup buffer may be more likely to vary among different bristles and/or along the column of a given bristle, since it may be loaded at different times and from different sources (i.e. different portions of the digital canvas). In some embodiments, the color and/or other properties of the paint stored in the pickup buffer may vary greatly over the course of a single brush stroke, since the virtual brush may sweep over paint in different locations on the canvas that have different colors and/or other properties during the course of the brush stroke.

In some embodiments of the paint load model described herein, paint does not flow from the reservoir to the pickup, as in conventional methods. Instead, both buffers may directly deposit paint on to the canvas. FIG. 3 illustrates one embodiment of a painting simulation technique that uses a reservoir buffer 310 and a pickup buffer 320 to model paint on a brush, and in which both buffers can directly deposit paint on to a digital canvas 330. As illustrated in FIG. 3, paint may also be picked up from canvas 330, and the picked up paint may be loaded into pickup buffer 320.

Figure 4:
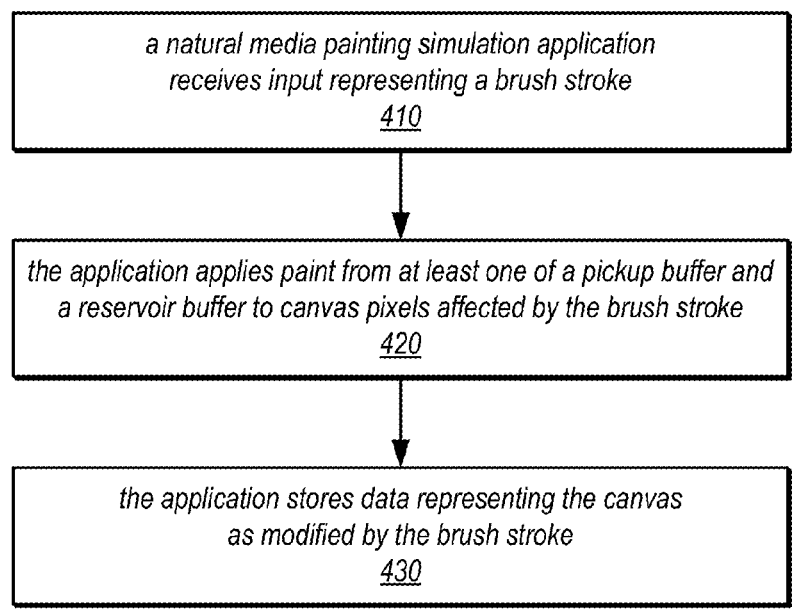
FIG. 4 is a flow diagram illustrating one embodiment of a method for simulating a paint brush stroke using a brush model that includes a reservoir buffer and a pickup buffer.

One embodiment of a method for simulating a paint brush stroke using a brush model that includes a reservoir buffer and a pickup buffer is illustrated by the flow diagram in FIG. 4. As illustrated at 410 in this example, the method may include a natural media painting simulation application receiving input representing a stroke made by a physical paint brush. For example, the application may receive such input from a brush tool of a graphical user interface, such as one manipulated by a user via a mouse, trackball, stylus, or other input mechanism to represent the bristles of a paint brush sweeping over a canvas. In some embodiments, a model of a brush tool (i.e. a brush model) that provides a virtual representation of a paint brush may include both a pickup buffer and a reservoir buffer, and each of these buffers may store paint that can be deposited on a digital canvas by a brush stroke. As illustrated at 420, in response to receiving input representing a brush stroke, the method may include the application applying paint from one or more of the buffers to canvas pixels affected by the brush stroke (i.e. pixels on the digital canvas over which the brush tool sweeps). The method may also include the application storing data representing the canvas as modified by the brush stroke, as in 430.

Figure 5A:
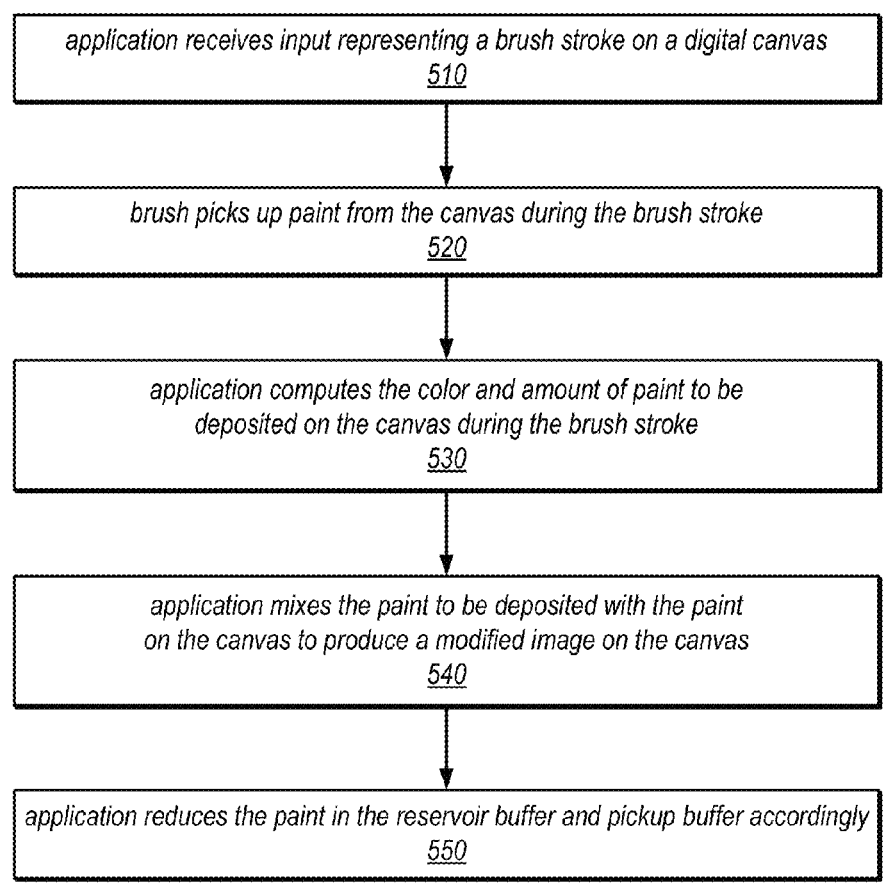
FIG. 5A is a flow diagram illustrating one embodiment of a method for simulating the flow of paint in a brush model that includes a reservoir buffer and a pickup buffer.
Figure 5B:
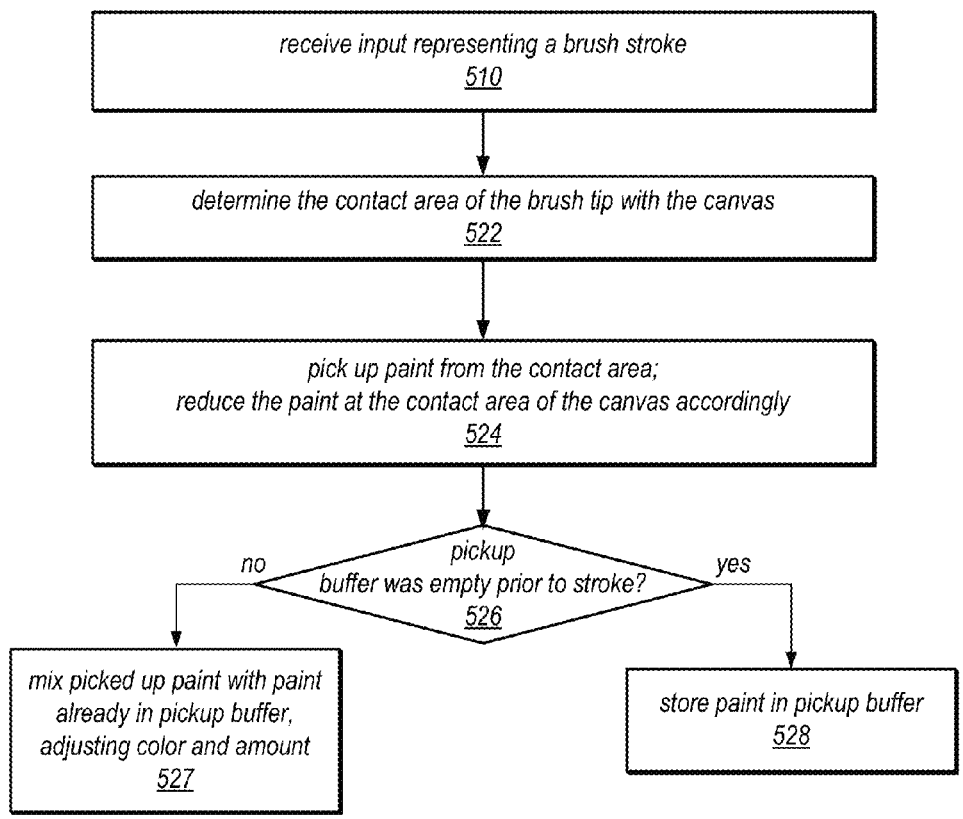
FIG. 5B is a flow diagram illustrating one embodiment of a method for loading paint into a pickup buffer.
Figure 5C:
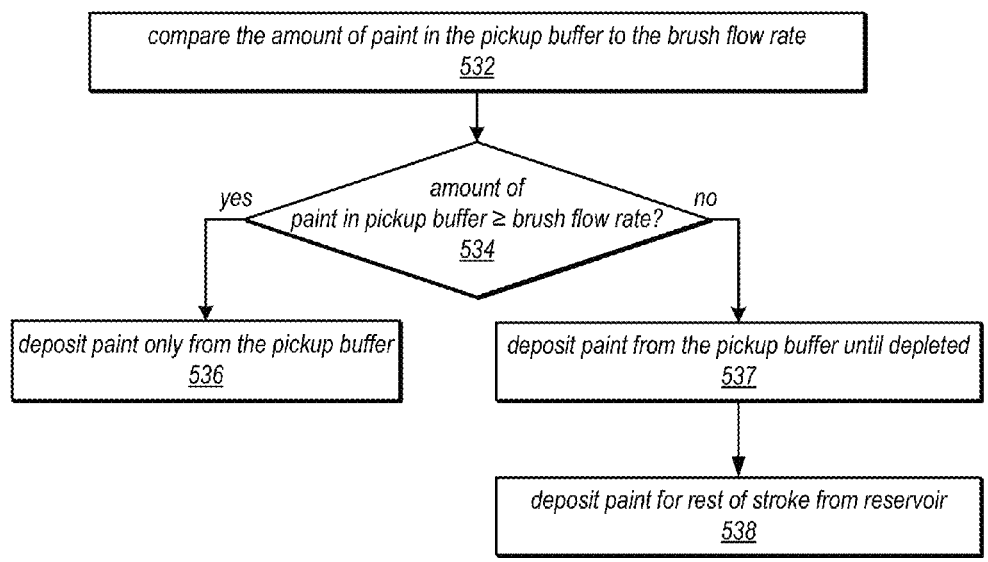
FIG. 5C is a flow diagram illustrating one embodiment of a method for computing the color and amount of paint to be deposited from each of a reservoir buffer and a pickup buffer.

FIGS. 5A-5C illustrate various methods for simulating natural media painting in more detail than that illustrated in FIG. 4, according to one embodiment. Note that in some embodiments the operations illustrated in various elements of FIGS. 5A-5C may be performed at each discrete time step of a painting stroke. FIG. 5A is a flow diagram illustrating one embodiment of a method for simulating the flow of paint between the reservoir and pickup buffers and a digital canvas in an application that models brush behavior using both a reservoir buffer and a pickup buffer. As illustrated in this example, the method may include the application receiving input representing a brush stroke on a digital canvas, as in 510. The method may include the brush model picking up paint from the canvas during the brush stroke, as in 520. Operations involved in picking up paint from the canvas are illustrated in more detail in FIG. 5B, and are described below, according to some embodiments.

As previously noted, in some embodiments, the application may support the deposition of paint directly from both the reservoir buffer and the pickup buffer. As illustrated in FIG. 5A, the painting simulation method may include the application computing the color and amount of paint to be deposited on the canvas during the brush stroke, as in 530. Operations involved in the computation of the color and amount of paint to be deposited from the pickup buffer and/or the reservoir buffer are illustrated in more detail in FIG. 5C and are described below, according to some embodiments. Once the color and amount of paint to be deposited by the brush have been computed, the method may include mixing the paint to be deposited with the paint already on the canvas to produce a modified image on the canvas, as in 540. Note that the painting simulation application may use any standard or custom mixing and/or blending techniques when mixing paint from the pickup buffer and the reservoir buffer, or when mixing paint from the brush model and the affected canvas pixels, including, but not limited to, those described herein.

As illustrated at 550, after depositing paint on the canvas, the method may include the application reducing the amount of paint in the reservoir buffer and the pickup buffer accordingly. For example, the amount of paint in the reservoir buffer may be reduced by the amount of paint that was deposited from the reservoir buffer, and the amount of paint in the pickup buffer may be reduced by the amount of paint that was deposited from the pickup buffer.

As noted above, FIG. 5B illustrates a method for loading paint into a pickup buffer, according to some embodiments. In this example, in response to receiving input representing a brush stroke (as in 510), the method may include the application determining the contact area of the brush tip with the canvas. In some embodiments, only the corresponding cells of the reservoir, pickup, and canvas buffers that are relevant to the contact area are operated on for the remainder of the method (i.e. only those cells corresponding to canvas cells that are in contact with brush model cells during a particular discrete time step). As illustrated at 524, the method may include picking up paint from the contact area, which may include reducing the amount of paint at the contact area of the canvas accordingly. In other words, the canvas paint may be reduced by the amount of paint that was picked up by the brush tip.

As illustrated in this example, if the corresponding cells of the pickup buffer (i.e. those cells corresponding to portions of the brush that are in contact with the canvas for the particular discrete time step) were empty prior to the brush stroke (or time step thereof), the method may include storing the color and amount of paint picked up from the canvas in the pickup buffer. This is shown as the positive exit from 526 and element 528. If the corresponding cells of the pickup buffer were not empty prior to the brush stroke (or time step thereof), the method may include mixing the picked up paint with paint already stored in the corresponding cells in pickup buffer based on the pickup flow rate, the amount of paint already in the pickup buffer, and the amount of paint that was on the canvas (and, by extension, the amount of paint picked up). This is shown as the negative exit from 526 and element 527.

As illustrated in FIG. 5B, the method may include adjusting the color and amount of paint in the pickup buffer as a result of this mixing. In other words, the pickup buffer data may be adjusted to reflect the fact that additional paint has been mixed with paint previously stored in the pickup buffer, e.g., increasing the total amount of paint stored in the pickup buffer, and changing the color of the paint stored in at least some of the cells of the pickup buffer (assuming the color of the picked up paint is different from the color of paint present in the pickup buffer).

FIG. 5C is a flow diagram illustrating one embodiment of a method for computing the color and amount of paint to be deposited on the canvas from each of a reservoir buffer and a pickup buffer. As illustrated in this example, the color and amount of paint to be deposited by the brush may be computed based on the brush flow rate, the amount of paint in the pickup buffer, and the amount of paint in the reservoir buffer. For example, in some embodiments if a large amount of paint is picked up from the canvas, the application may be configured to deplete the pickup buffer first, mimicking the behavior of a physical paint brush that picks up a large amount of paint from a canvas during a brush stroke. In such embodiments, the method may include comparing the amount of paint in the pickup buffer to the brush flow rate, as illustrated at 532. In this example, if the amount of paint in the pickup buffer is greater than or equal to the brush flow rate, shown as the positive exit from 534, then method may include depositing paint only from the pickup buffer, as in 536. On the other hand, if the amount of paint in the pickup buffer is less than the brush flow rate, shown as the negative exit from 534, the method may include depositing paint from the pickup buffer until it is depleted (or nearly depleted), as in 537, and then depositing paint from the reservoir buffer (which may be mixed with the last of the picked up paint, if any, for a portion of the stroke) for the remainder of the stroke (i.e. until the total amount paint deposited by the brush stroke is the amount of paint that should be deposited according to the brush flow rate), as in 538.

As noted above, in some embodiments, the operations illustrated in various elements of FIGS. 5A-5C may be repeated for each discrete time step of a painting stroke. For example, the discrete time step may be defined as an atomic temporal unit of a stroke; that is, a single stroke of a brush may include multiple discrete time steps, and the color and amount of paint picked up and/or deposited by the brush tool during the stroke may be determined, computed, and/or applied for a set of canvas pixels that are in contact with the brush tool at each time step.

Figure 6:
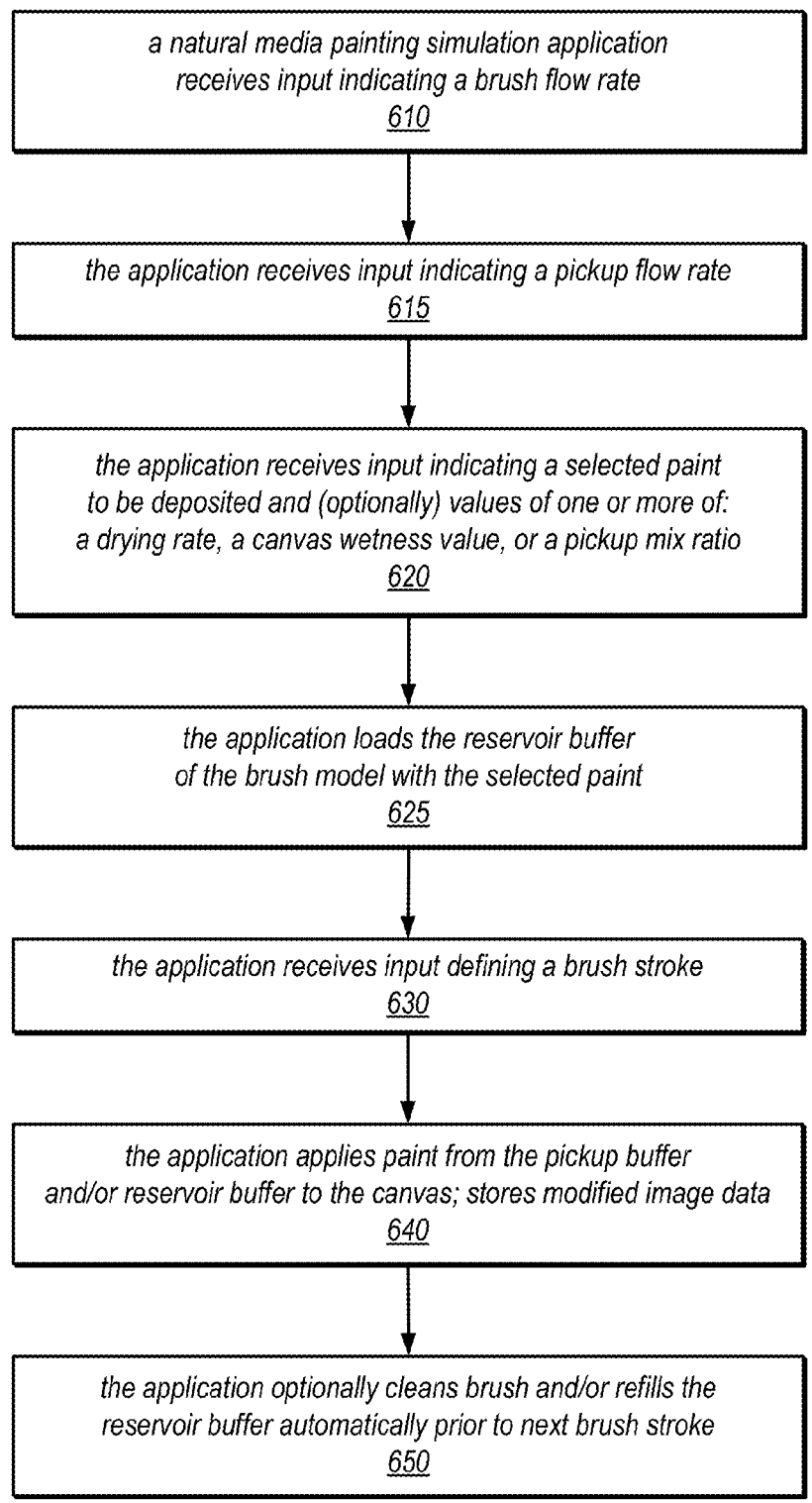
FIG. 6 is a flow diagram illustrating one embodiment of a digital painting workflow in a system that models paint on a brush using a reservoir buffer and a pickup buffer.

FIG. 6 is a flow diagram illustrating one embodiment of a digital painting workflow in a system that models paint on a brush using both a reservoir buffer and a pickup buffer. As illustrated at 610, the method may include a natural media painting simulation application receiving input indicating a particular brush flow rate for one or more brush strokes. For example, the application may obtain a default brush flow rate stored in memory for the application, or may receive input specifying a brush flow rate from a user through a graphical user interface (e.g., using a slider bar or another input mechanism), in different embodiments. As illustrated at 615, the method may also include the application receiving input indicating a pickup flow rate for one or more brush strokes. For example, the application may obtain a default pickup flow rate stored in memory for the application, or may receive input specifying a pickup flow rate from a user through a graphical user interface (e.g., using a slider bar or another input mechanism), in different embodiments. The method may also include the application receiving input indicating a selected paint to be deposited by one or more brush strokes, as in 620. In some embodiments the application may also obtain (or receive from a user) values of one or more physically meaningful painting parameters, such as a drying rate, a canvas wetness value, or a pickup mix ratio. Such parameters are described in more detail below. As illustrated in FIG. 6, the method may include the application loading the reservoir buffer of the brush model with the selected paint, as in 625.

After the brush model is loaded with the selected paint, the method may include the application receiving input defining a brush stroke, as in 630, and applying paint from the pickup buffer and/or the reservoir buffer to the canvas, as described herein. As illustrated at 640, the method may also include storing data representing the modified canvas (i.e. data representing the image on the canvas as modified by the brush stroke) in memory. In some embodiments, the method may include the application automatically cleaning the brush model and/or refilling the reservoir buffer prior to the next brush stroke (e.g., if such optional features are enabled for the current workflow), as in 650. Examples of such automatic brush cleaning and filling features are described in more detail below. Note that any or all of the operations illustrated in FIG. 6 may be repeated during a given painting simulation session to apply multiple brush strokes to a digital canvas. For example, the operations illustrated in 630-650 may be repeated to apply multiple strokes of the same paint to the canvas, or the operations illustrated in 620-650 or in 610-650 may be repeated to apply brush various strokes to the canvas using different paints, in some embodiments.

When a physical paint brush is used to paint on canvas, the length of the resulting brush stroke is determined, at least in part, by how quickly the paint on the brush dries (by being deposited on the canvas). If there is paint already on the canvas, the extent to which the paint on the canvas mixes with the paint on the brush is determined by how wet the paint on the canvas is and how wet the paint on the brush is. In some embodiments, the painting simulation applications described herein may provide a set of one or more parameters to control canvas wetness, the rate at which paint dries, and/or various paint mixing settings for a virtual paint brush. In such embodiments, these parameters may be used (and adjusted) to simulate a wide variety of color mixing and streaking effects similar to the effects that may be created using a physical brush moving through real paint on a physical canvas. For example, they may be adjusted so that a brush stroke produces long, faint streaks, or shorter, brighter streaks, such as by affecting how much paint is picked up from the canvas during the stroke and/or how evenly paint picked up from the canvas is distributed throughout the rest of the stroke. A value of a color mixing type parameter may control how much of the picked up paint is present in the output (i.e. the amount reflected in the pixel data of an image on the digital canvas) or how much of the picked up paint can be seen in the output image. For example, a higher mixing value may cause a streak to appear quickly, while a lower mixing value may result in a streak that lasts longer, but has less of an effect on the overall appearance of the brush stroke. A set of configurable parameters provided in the application may be physically meaningful, and thus may help to simulate an organic painting experience. For example, in some embodiments, an intuitive set of parameters (such as those described below) may be used to simulate painting with different types of paints, e.g., oil paints, acrylic paints, watercolors, or paints having properties that are a mix of the properties of two or more paint types.

In some embodiments, three such parameters may be used and their values may be adjusted to produce a wide range of brush strokes and painting effects. For example, the parameters may include a drying rate (i.e. a parameter whose value reflects how quickly the paint being deposited dries out on the brush), a canvas wetness parameter, and a pickup mix ratio (i.e. a parameter whose value reflects the amount of paint picked up from the canvas that is mixed with paint already loaded on the brush). In various embodiments, these parameters may be applied in digital painting applications that employ bristle brush models or other types of brush models, and in digital painting applications that employ various paint load models (including, but not limited to, those described herein). Note that in embodiments in which the paint on a virtual brush is modeled using a pickup buffer and a reservoir buffer, as described above, the value of a pickup mix ratio parameter may influence the amount of paint from the pickup buffer that is mixed with paint from the reservoir buffer. In embodiments that do not include this paint load model, the value of a pickup mix ratio parameter may reflect the amount of picked up paint that is mixed with reservoir paint and stored in a single surface layer of the brush model, for example.

Figure 7:
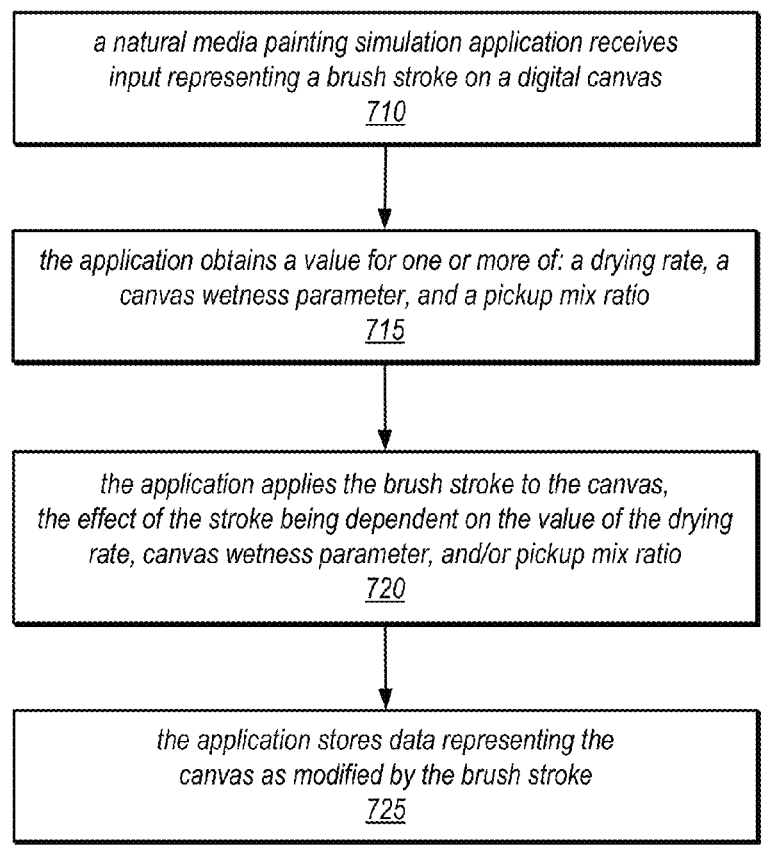
FIG. 7 is a flow diagram illustrating one embodiment of a method for applying one or more physically realistic natural media painting parameters in a painting simulation module.

One embodiment of a method for applying one or more physically realistic natural media painting parameters in a digital painting application (or simulation module thereof) is illustrated in FIG. 7. In this example, the method may include a natural media painting simulation application receiving input representing a brush stroke on a digital canvas, as in 710. As illustrated at 715, values for a drying rate, a canvas wetness parameter, and/or a pickup mix ratio may be obtained. For example, the application may obtain default or current values for one or more of these parameters from a memory in which they are stored, or current values may be specified by a user and received by the application through a graphical user interface, in different embodiments. In some embodiments, a set of default parameter values may be pre-defined for particular paints or paint types. For example, one set of default parameter values may be pre-defined for the simulation of oil paints, and a different set of default parameter values may be pre-defined for the simulation of watercolors, since watercolors typically dry faster than oil paints, both on a paint brush and on the canvas. In other embodiments, the user or the application may define parameter values for specific paints (including custom paints or paints that exhibit custom, user-defined painting properties). In some embodiments, one or more user interface elements, such as slider bars, text entry boxes, menus, dials, etc., may be provided via which a user may set or change the values of these parameters.

As illustrated at 720, in this example, the method may include the application applying the brush stroke to the digital canvas, and the effect of the stroke may be dependent on the values of the drying rate, canvas wetness parameter, and/or pickup mix ratio. The effect of each of these parameters on various brush strokes is described in more detail below. In some embodiments, the application may store data representing the canvas as modified by the brush stroke, as in 725. Note that the operations illustrated in FIG. 7 may be repeated to apply one or more additional brush strokes to the digital canvas using the same paint or a different paint (e.g., if another paint is selected between brush strokes).

Figure 8A:
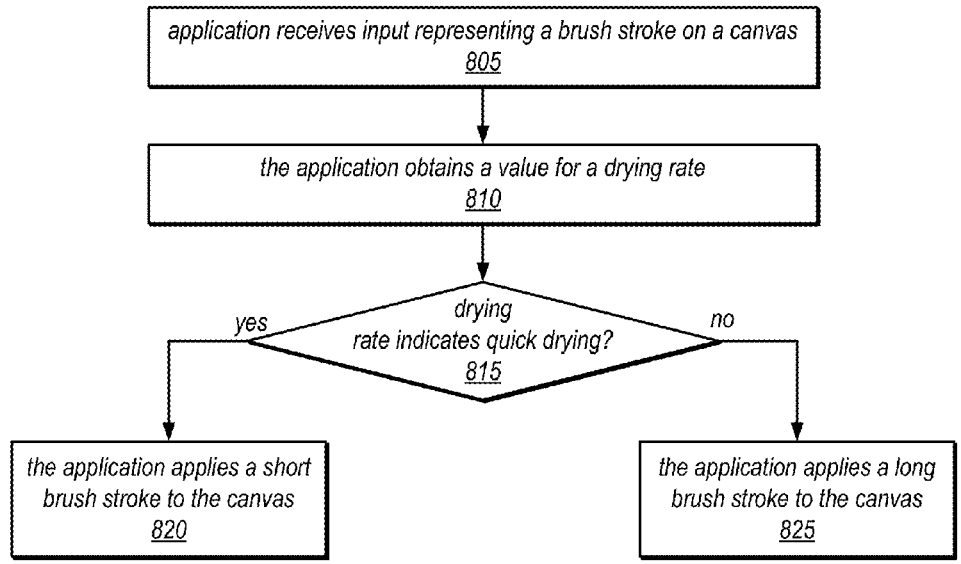
FIG. 8A is a flow diagram illustrating one embodiment of a method for applying a drying rate parameter value in a painting simulation module.

In some embodiments, a drying rate parameter (which may also be referred to as a "dryout" parameter, or a load parameter) may be used to set or adjust the rate at which paint being deposited dries out (i.e. dries on the brush), and thus the length of stroke that it is possible to deposit. For example, in some embodiments, a low drying rate value may allow long strokes to be deposited, while a high drying rate value may only allow relatively short strokes to be deposited. FIG. 8A is a flow diagram illustrating one embodiment of a method for applying a drying rate parameter value in a digital painting application (or simulation module thereof). As illustrated in this example, the method may include the application receiving input representing a brush stroke on a digital canvas, as in 805. The method may also include the application obtaining a value for a drying rate, as in 810. For example, in various embodiments, the drying rate may be obtained from a memory in which it is stored on behalf of the application, or may be received via a user interface, as described herein. If the drying rate indicates that the paint to be deposited is quick drying, shown as the positive exit from 815, the method may include the application applying a short brush stroke to the canvas, as in 820. For example, when the drying rate is high, the brush model may run out of paint that is wet enough to deposit on the canvas during the application of the brush stroke, and the swath of paint deposited on the canvas may be thinned out and/or non-existent by the end of the brush stroke.

If the drying rate does not indicate that the paint to be deposited is quick drying, shown as the negative exit from 815, the method may include the application applying a long brush stroke to the canvas, as in 825. For example, when the drying rate is low, the brush model may not run out of paint that is wet enough to deposit on the canvas during the application of the brush stroke, and the paint deposited on the canvas may appear as a relatively full swath of paint for the during of the brush stroke.

Figure 8B:
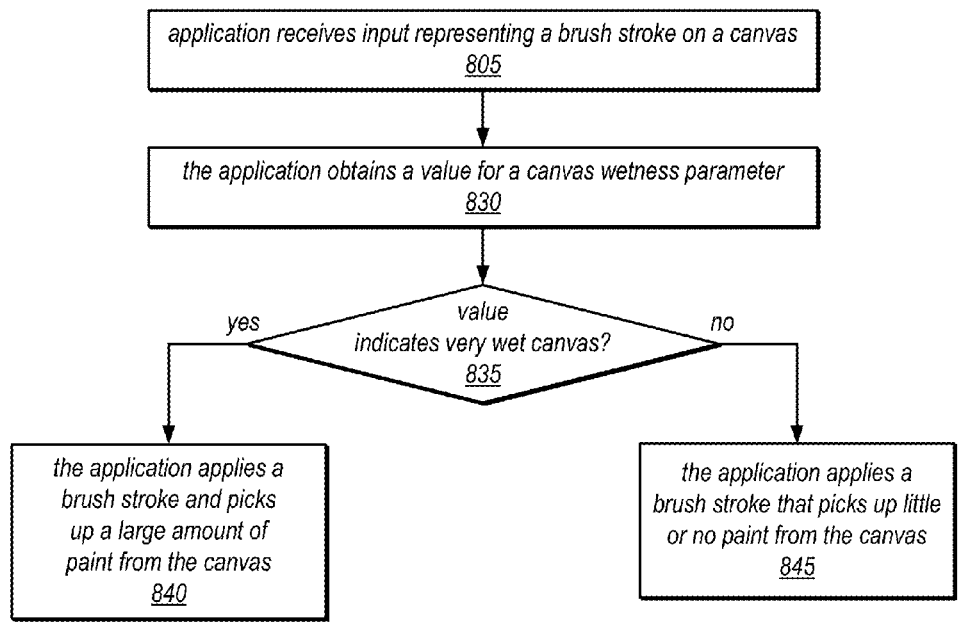
FIG. 8B is a flow diagram illustrating one embodiment of a method for applying a canvas wetness parameter value in a painting simulation module.

In some embodiments, a canvas wetness parameter may be used to set or adjust the amount of paint that is picked up from the canvas during a brush stroke and eventually mixed with paint on the brush. For example, if the value of the canvas wetness parameter is high, indicating that the paint already present on the canvas is very wet, more paint may be picked up by the brush during a brush stroke than if the value of the canvas wetness parameter is low. FIG. 8B is a flow diagram illustrating one embodiment of a method for applying a canvas wetness parameter value in a digital painting application (or simulation module thereof). As illustrated in this example, the method may include the application receiving input representing a brush stroke on a digital canvas, as in 805. The method may also include the application obtaining a value for a canvas wetness parameter, as in 830. For example, in various embodiments, the value of the canvas wetness parameter may be obtained from a memory in which it is stored on behalf of the application, or may be received via a user interface, as described herein. If the value of the canvas wetness parameter indicates that the canvas is very wet, shown as the positive exit from 835, the method may include the application applying a brush stroke to the canvas during which a lot of paint is picked up from the canvas, as in 840. As described herein, in some embodiments, paint picked up during the stroke may be loaded into a pickup buffer of the brush model, mixed with paint already stored in the pickup buffer, and/or re-deposited on the canvas during this or a different brush stroke (e.g., with or without being mixed with paint from a reservoir buffer of the brush model and/or additional paint on the canvas).

If the value of the canvas wetness parameter does not indicate that the canvas is very wet, shown as the negative exit from 835, the method may include the application applying a brush stroke to the canvas during which little or no paint is picked up from the canvas, as in 845. Therefore, in some embodiments, the paint deposited during the current brush stroke may include little or no paint picked up from the canvas during the current brush stroke, but may consist largely of paint from a reservoir buffer of the brush model and/or paint stored in a pickup buffer of the brush model during a previous brush stroke.

Figure 8C:
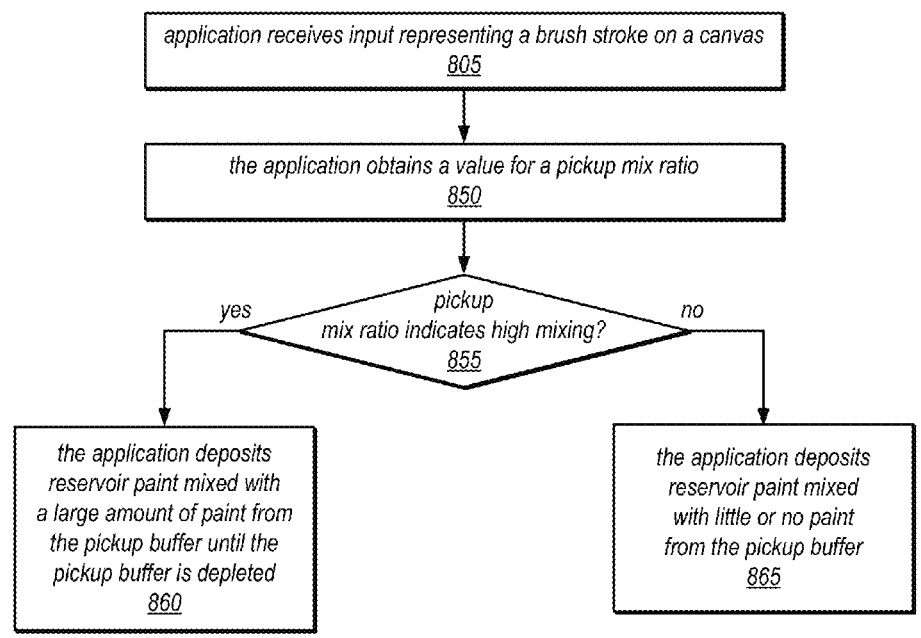
FIG. 8C is a flow diagram illustrating one embodiment of a method for applying a pickup mix ratio value in a painting simulation module.

In some embodiments, a pickup mix ratio (which may also be referred to simply as a "mix parameter") may be used to set or adjust the extent to which the paint picked up from the canvas is forcibly mixed with the paint already on the brush. For example, in some embodiments, if the pickup mix ratio is high, more paint from a pickup buffer of the brush model may be mixed with paint from a reservoir buffer of the brush model than if the pickup mix ratio is low. FIG. 8C is a flow diagram illustrating one embodiment of a method for applying a pickup mix ratio value in a digital painting application (or simulation module thereof). As illustrated in this example, the method may include the application receiving input representing a brush stroke on a digital canvas, as in 805. The method may also include the application obtaining a value for a pickup mix ratio, as in 850. For example, in various embodiments, the value of the pickup mix ratio may be obtained from a memory in which it is stored on behalf of the application, or may be received via a user interface, as described herein. In some embodiments, if the value of the pickup mix ratio indicates that a lot of paint picked up from the canvas should be mixed in with paint in a reservoir buffer of the brush model, shown as the positive exit from 855, the method may include the application applying a brush stroke to the canvas during which a large amount of paint picked up from the canvas is mixed with paint from the reservoir buffer and deposited on the canvas until the pickup buffer is depleted, as in 860. For example, in some embodiments, paint picked up during the stroke may be loaded into a pickup buffer of the brush model and mixed with paint already stored in the pickup buffer (i.e. paint that was stored in a pickup buffer of the brush model during this or a previous brush stroke). When the pickup mix ratio is high, a large amount of the paint stored in the pickup buffer may be mixed with paint from the reservoir buffer and re-deposited on the canvas during the current brush stroke.

In some embodiments, if the value of the pickup mix ratio does not indicate that a lot of paint picked up from the canvas should be mixed in with paint in a reservoir buffer of the brush model, shown as the negative exit from 855, the method may include the application applying a brush stroke to the canvas during which little or no paint that was picked up from the canvas is re-deposited on the canvas, as in 865. In other words, if the pickup mix ratio is low, the paint deposited during the current brush stroke may consist largely (or entirely) of paint from the reservoir buffer.

In one example, if the reservoir buffer of a brush model stores white paint and the virtual brush paints over an area of (wet) red paint while a pickup mix ratio is set to 50%, the resulting stroke may appear as a pink smear until the picked up red paint has been depleted, with the rest of the stroke being white. In a similar example, if the pickup mix ratio is set to 10%, the resulting stroke may appear as a very light pink smear until the red is paint has been depleted (which may take longer than in the previous example), with the rest of the stroke being white. Note that if the pickup mix ratio is set to 0%, none of the paint picked up may be re-deposited during the stroke (resulting in a stroke that is all white, in these examples), and if the pickup mix ratio is set to 100%, only the paint the that was picked up maybe deposited (resulting in a stroke that is all red, in these examples). As illustrated in these examples, a digital painting application that supports a configurable pickup mix ratio may provide users with more control over the ratio of reservoir paint and picked up paint deposited during a given brush stroke. Without this configurable parameter, in the example above, if there is enough paint in the pickup buffer to satisfy the brush flow rate, the application may only deposit paint from the pickup buffer until it is depleted (as illustrated in FIG. 5C). The configurable pickup mix ratio may allow users to forcibly mix in reservoir paint even in this case. Again note that in some embodiments, a configurable pickup mix ratio may be applied in a digital painting application that models paint on a brush without the use of a separate pickup buffer. In such embodiments, the value of this configurable parameter may be used to determine the length of a streak produced when re-depositing picked up paint or when depositing a mix of picked up paint and reservoir paint.

Figure 9:
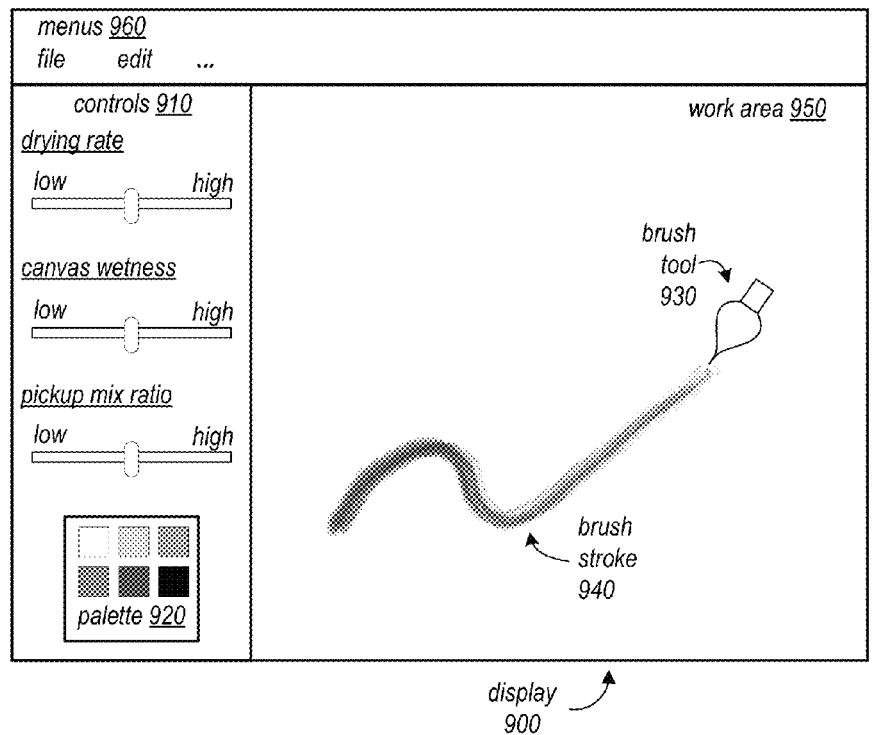
FIG. 9 illustrates one embodiment of a user interface that includes slider bars for setting and adjusting the values of a drying rate parameter, a canvas wetness parameter, and pickup mix ratio for strokes drawn on a digital canvas using a virtual paint brush.

FIG. 9 illustrates an example user interface of a digital painting application that includes slider bars for setting and/or adjusting the values of a drying rate parameter, a canvas wetness parameter, and pickup mix ratio for strokes drawn on a digital canvas using a virtual brush, according to some embodiments. In this example, the user interface is presented on display 900, which is divided into three regions or areas: menus 960, controls 910 (which includes palette 920), and work area 950. In this example, controls 910 may include one or more user-modifiable controls, such as slider bars, buttons, dials, pop-up menus, pull-down menus, alphanumeric text entry boxes, etc., for specifying various parameters of the painting functions to be applied to a digital canvas. In this example, three slider bars are provided to specify values of a drying rate parameter, a canvas wetness parameter, and pickup mix ratio. In other embodiments, slider bars may be used to specify values (or relative values) of other configurable parameters of a painting function, such as an amount of ink, a pigment concentration amount, a transparency value, a brush type, a brush width, a bristle stiffness, or other parameters that are to be applied when using brush tool 930 to apply paint on the digital canvas being edited in work area 950. Various methods of specifying values of any of the parameters used in simulating painting effects (i.e. methods other than those illustrated in FIG. 9) may be used in other embodiments. In some embodiments, slider bars or another input mechanism in controls area 910 may be used to override a pre-set or default value of one or more of the parameters used in the digital painting application. Other optional tools may be included in the user interface in various embodiments, such as an eraser function, a reset function, or an "undo" tool that undoes the most recent user action in the work area 950.

In the example illustrated in FIG. 9, menus 960 may include one or more menus, for example menus used to navigate to other displays in the painting application, open files, print or save files, undo/redo actions, and so on. In this example, work area 950 is the area in which an image on a digital canvas that is being created or edited is displayed as various digital painting operations are performed. In various embodiments, work area 950 may display a portion or all of a digital canvas to which paint is to be added, or a portion or all of a previously existing digital canvas being modified by adding paint, as described herein. In the example illustrated in FIG. 9, work area 950 illustrates a digital painting session in progress, in which a brush tool 930 has been used to paint a brush stroke 940 on a digital canvas.

Figure 10:
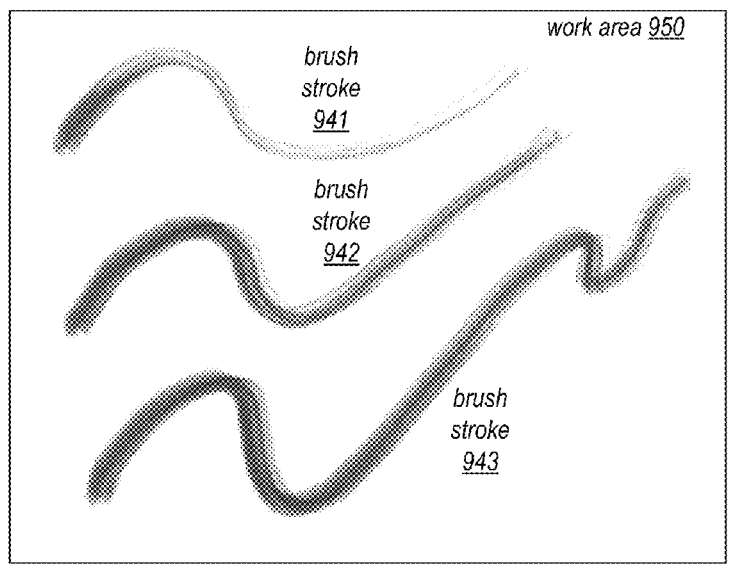
FIG. 10 illustrates changes to the length of a brush stroke as the value of a drying rate parameter is changed, according to some embodiments.

FIG. 10 illustrates work area 950 following the application of three brush strokes to the digital canvas. Specifically, FIG. 10 illustrates the changes in the length and appearance of a brush stroke as the value of a drying rate parameter is changed, according to some embodiments. In this example, brush stroke 943 was made with a relatively low drying rate value of 10%, brush stroke 942 was made with a mid-range drying rate value of 50%, and brush stroke 941 was made with a relatively high drying rate value of 85%. As described herein the drying rate parameter may represent the rate at which paint being deposited dries while the brush stroke is being applied, and thus may affect the amount of paint that can be deposited at different points along the path of the brush tool. As illustrated in FIG. 10, brush stroke 943 (made with a low drying rate value) is comparatively longer than the two strokes made with higher drying rate values, and brush stroke 941 (made with a high drying rate value) is comparatively shorter than the two strokes made with lower drying rate values. Note also that the swath of paint deposited toward the end of brush stroke 943 (made with a low drying rate value) is comparatively fuller than the swath of paint deposited toward the end of the two strokes made with higher drying rate values, and the swath of paint deposited toward the end of brush stroke brush stroke 941 (made with a high drying rate value) is comparatively thinner than the swath of paint deposited toward the end of the two strokes made with lower drying rate values. Note that in embodiments that employ a bristle brush model, the value of the drying rate parameter may be the same or different for the paint stored in and/or deposited by different ones of the bristles. Note also that even if the drying rate parameter value is the same for the paint stored in and/or deposited by different ones of the bristles, because various bristles may be in contact with the canvas for different lengths of time, they may run out of paint at different times, in some embodiments.

Figure 11:
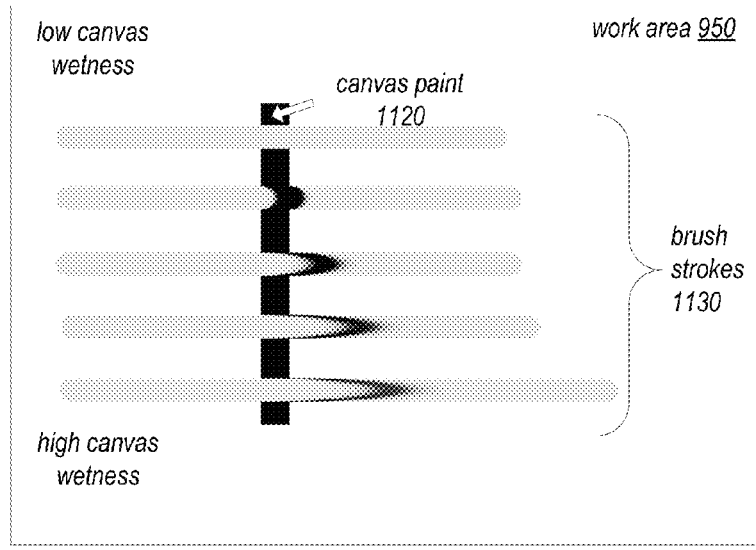
FIG. 11 illustrates changes to a brush stroke as the value of a canvas wetness parameter is increased, according to some embodiments.

FIG. 11 illustrates work area 950 following the application of five brush strokes to the digital canvas. Specifically, FIG. 11 illustrates the changes to a brush stroke as the value of a canvas wetness parameter is increased, according to some embodiments. In this example, five brush strokes 1130 were applied to the canvas from left to right, each sweeping over exiting canvas paint 1120. In this example, the canvas wetness parameter was set to different values for each of the five strokes, with the canvas wetness parameter value being the lowest for the brush stroke depicted near the top of work area 950 and incrementally increasing for each of the brush strokes below the top brush stroke. As described herein, if the canvas wetness parameter is set to a low value, relatively little paint will be picked up from the canvas (as compared to the amount of paint pickup up from the canvas when the canvas wetness parameter is set to higher values). As illustrated in FIG. 11, setting the canvas wetness parameter to a lower value may result in a relatively lower amount of streaking as compared to the streaking that results when a brush stroke passes over canvas paint while the canvas wetness parameter value is set to a higher value. As illustrated in FIG. 11, the brush stroke made with the highest canvas wetness parameter value picked up more paint from the canvas than the brush strokes made with lower canvas wetness parameter values, and this brush stroke made in a larger streak than did the brush strokes made with lower canvas wetness parameter values.

Figure 12:
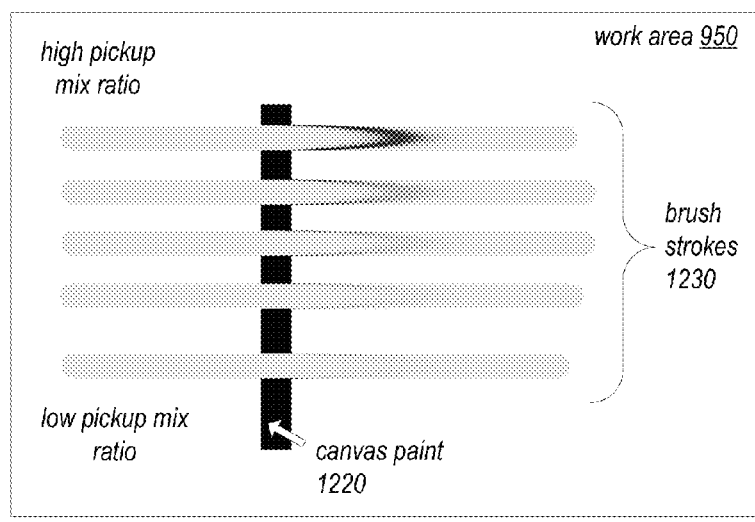
FIG. 12 illustrates changes to a brush stroke as the value of a pickup mix ratio is decreased, according to some embodiments.

FIG. 12 illustrates work area 950 following the application of five brush strokes to the digital canvas. Specifically, FIG. 12 illustrates the changes to a brush stroke as the value of the pickup mix ratio is decreased, according to some embodiments. For illustrative purposes, a high canvas wetness value (e.g., 100%) is assumed in this example. In this example, five brush strokes 1230 were applied to the canvas from left to right, each sweeping over exiting canvas paint 1220. In this example, the pickup mix ratio was set to different values for each of the five strokes, with the pickup mix ratio value being the highest for the brush stroke depicted near the top of work area 950 and incrementally decreasing for each of the brush strokes below the top brush stroke. As described herein (and assuming a high canvas wetness value), a relatively high pickup mix ratio value may result in the brush stroke primarily streaking the paint that was picked up from the canvas over the canvas (i.e. without mixing in very much, if any, paint that was already on the brush). A low pickup mix ratio value may result in comparatively more of the paint already on the brush being blended with the picked-up canvas paint, and the blended paint being streaked on the canvas. As illustrated in FIG. 12, setting the pickup mix ratio to a lower value may result in a relatively lower amount of picked up paint being mixed with the paint already on the brush and re-applied to the digital canvas as compared to the amount of picked-up paint that is mixed with the paint already on the brush and re-applied to the digital canvas when a brush stroke passes over canvas paint while the canvas pickup mix ratio value is set to a higher value. As illustrated in FIG. 12, the brush stroke made with the highest pickup mix ratio value picked up (and streaked) more paint from the canvas than the brush strokes made with lower pickup mix ratio values.

As described above, in some embodiments that employ a pickup buffer and a reservoir buffer (and in which paint may be deposited directly from both buffers), a pickup mix ratio may control how much paint is taken from each of the two buffers and deposited on the digital canvas. In some embodiments, the default mode may be that if the pickup buffer contains enough paint to be able to match the brush flow rate for a given brush stroke, all paint to be deposited by that brush stroke will come from the pickup buffer (until the pickup buffer is depleted). In some embodiments, the user may override this default mode and adjust the pickup mix ratio to forcibly mix in paint from the reservoir buffer, even when the pickup buffer could satisfy the brush flow rate. Lowering the pickup mix ratio may result in more paint being mixed from the reservoir buffer during the stroke. The pickup mix ratio may thus be used to control the length and intensity of a streak made by picked-up paint, e.g., whether a long, faint streak is produced (if the pickup mix ratio is set low), or a short, intense streak is produced (if the pickup mix ratio is set high).

By adjusting the values of the drying rate parameter, canvas wetness parameter, and/or pickup mix ratio of a digital painting application, a wide variety of strokes and stroke effects may be possible, as demonstrated in FIGS. 9 through 12. Since this parameter set is relatively small and is physically meaningful, it may in some embodiments provide the user a more natural, intuitive, and organic method to achieve various stroke effects than is provided in conventional painting simulation tools.

Figure 13:
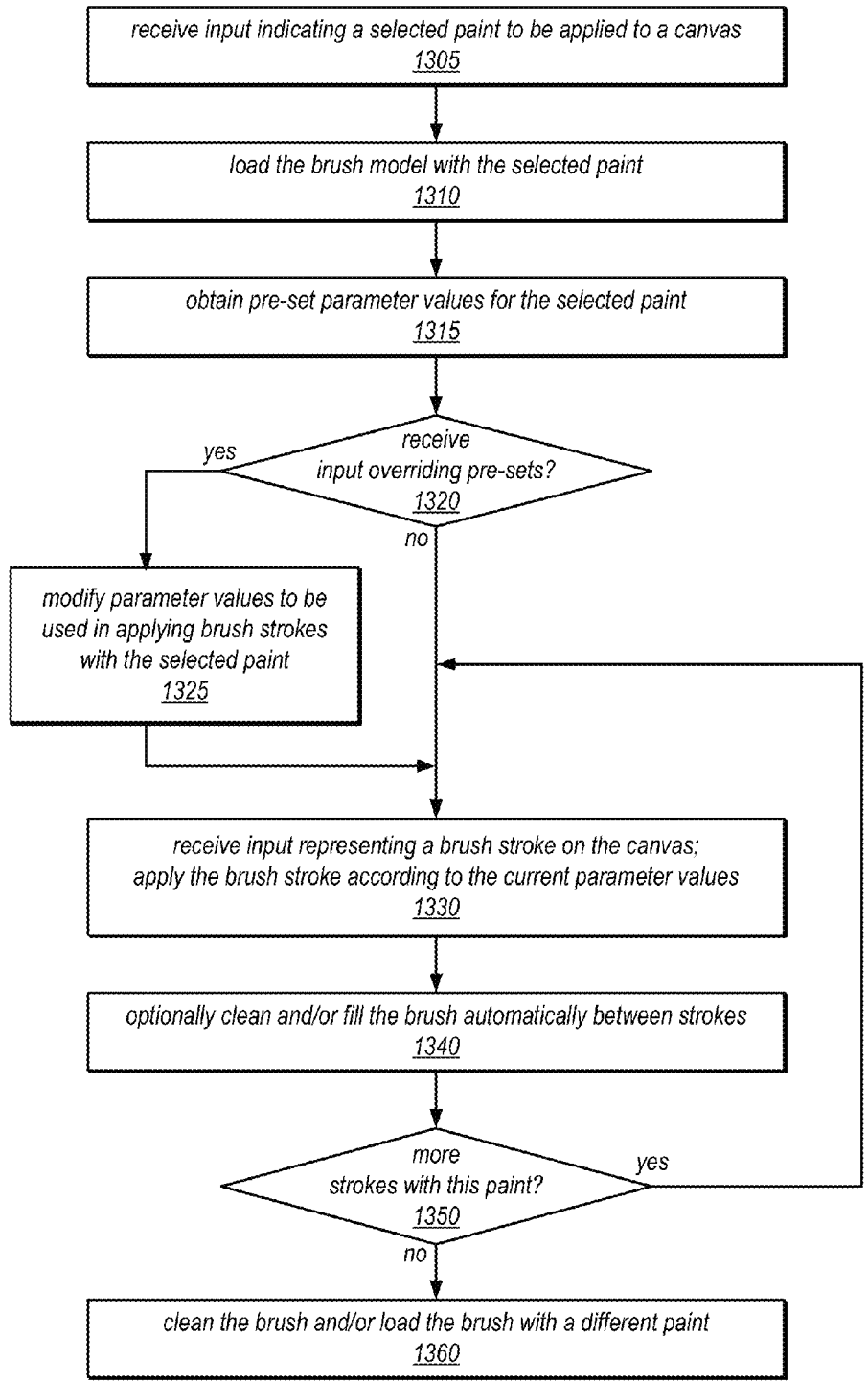
FIG. 13 is a flow diagram illustrating one embodiment of a digital painting workflow using a painting simulation module that applies one or more physically realistic natural media painting parameters.

One embodiment of a digital painting workflow using a digital painting application (or simulation module thereof) that applies one or more physically realistic natural media painting parameters is illustrated by the flow diagram in FIG. 13. As illustrated in this example, the method may include the application receiving input indicating a selected paint to be applied to a digital canvas, as in 1305. For example, the application may receive input specifying a color and/or type of paint through a graphical user interface that includes one or more slider bars, dials, pull down menus, check boxes, or other input mechanisms, in different embodiments. The method may include the application loading a brush model with the selected paint, as in 1310. For example, in embodiments in which paint is stored in the brush model in two layers, as described herein, the application may load the selected paint into cells of the reservoir buffer. As illustrated at 1315 in FIG. 13, in some embodiments, the method may include obtaining pre-set parameter values for the selected paint. For example, values of a drying rate parameter, canvas wetness parameter, and/or pickup mix ratio may be pre-defined for each available paint or paint type, for a given painting session or painting workflow, for a given canvas type (which may also be selectable), or for a given brush type (which may also be selectable).

As illustrated in this example, the method may include the application receiving one or more inputs overriding the pre-set values of one or more configurable painting parameters (such as a drying rate parameter, canvas wetness parameter, and/or pickup mix ratio), as in 1320. For example, in some embodiments, slider bars, dials, pull-down menus, check boxes, or other input mechanisms may be provided, and a user may modify the current or pre-set values of these configurable parameters. Note that in other embodiments, there may be no pre-defined values for some or all of these parameters, and/or they may be set by the user for a particular brush stroke, painting session, workflow, or canvas. In still other embodiments, the value of the canvas wetness parameter and/or the value of the pickup mix ratio may be mapped to another input channel (e.g., pressure applied by or to the brush) and may vary during a given brush stroke as the value of the other input varies. If the application receives input overriding any pre-set parameter values, shown as the positive exit from 1320, the method may include the application modifying those parameter values for use in applying one or more brush strokes with the selected paint, as in 1325. As illustrated at 1330, in response to the application receiving input representing a brush stroke on the canvas, the application may apply the brush stroke with the selected paint, and the appearance of the stroke may be dependent on the current values of these configurable parameters (e.g., one or more pre-set and/or user-modified parameter values).

In some embodiments, the method may include cleaning and/or filling the brush between strokes, as in 1340. For example, the digital painting application may support an optional (i.e. selectable) automatic brush cleaning and/or brush filling feature, as described in more detail below. If there are more brush strokes to be applied with the selected paint (and current parameter values), shown as the positive exit from 1350, the method may include the repeating the operations illustrated at 1330-1340 for one or more additional brush strokes. If no more brush strokes are to be applied with the selected paint (and current parameter values), shown as the negative exit from 1350, the method may include cleaning the brush and/or loading the brush with a different paint, as in 1360. For example, paint of a different color (and/or paint with different parameter values) may be loaded into the reservoir buffer of the brush model with or without first cleaning the brush (e.g., by emptying the reservoir buffer and/or a pickup buffer of the brush model), in different embodiments. Loading the brush model with different paint may involve the application receiving input indicating a different selected paint, as in 1305, after which any or all of the other operations illustrated in FIG. 13 may be repeated in order to apply one or more brush strokes with the newly selected paint (repeat not shown).

Physical paint brushes have paint loaded onto them as the painter pushes and rotates the brush either onto a canvas or onto a color palette. As the paint on the canvas is usually not all the same color, the physical paint brush may have paint of different colors loaded non-uniformly among the bristles and along each of the bristles. In some embodiments, the digital painting applications described herein may provide a mechanism via which a user may load paints of different colors onto a digital brush, e.g., from paint already deposited onto a digital canvas. The mechanism may be applicable to, and consistent between, both virtual brushes that model bristle brushes and static-tipped virtual brushes. The mechanism may allow a user to load paint onto the brush from the canvas, thus using the canvas as a color palette. Such a mechanism may reproduce actions taken in analog painting in the digital world. Using this mechanism, the painter may use a portion of the canvas or an off-canvas palette to mix paint, and then may load the brush non-uniformly from the mixed paint, effectively simulating the way painters often work in the real world. The user may mix paint using the virtual brush in a standard painting mode, and then invoke or enable a non-uniform paint loading mode to load a paint configuration from the mixed paint on the canvas into the reservoir.

For example, a user may apply one or more brush strokes with various values of the drying rate, canvas wetness, and pickup mix ratio parameters described above to mix paints and create a paint sample with a desired appearance (i.e. one that exhibits a non-uniform distribution of paint), and may use one of the non-uniform paint loading techniques described herein to load paint exhibiting that non-uniform distribution into the brush, e.g., into a reservoir buffer of the brush model. The user may then apply one or more brush strokes to apply paint matching the paint sample they created on another portion of the digital canvas. Note that in some embodiments, loading the virtual brush using one of the non-uniform loading techniques described herein may not reduce the amount of paint in the sampled portion of the canvas. In other words, sampling paint on the canvas to load a virtual brush in a non-uniform paint loading mode is not equivalent or analogous to an operation that merely picks up paint from the canvas and stores it on the brush.

Figure 14:
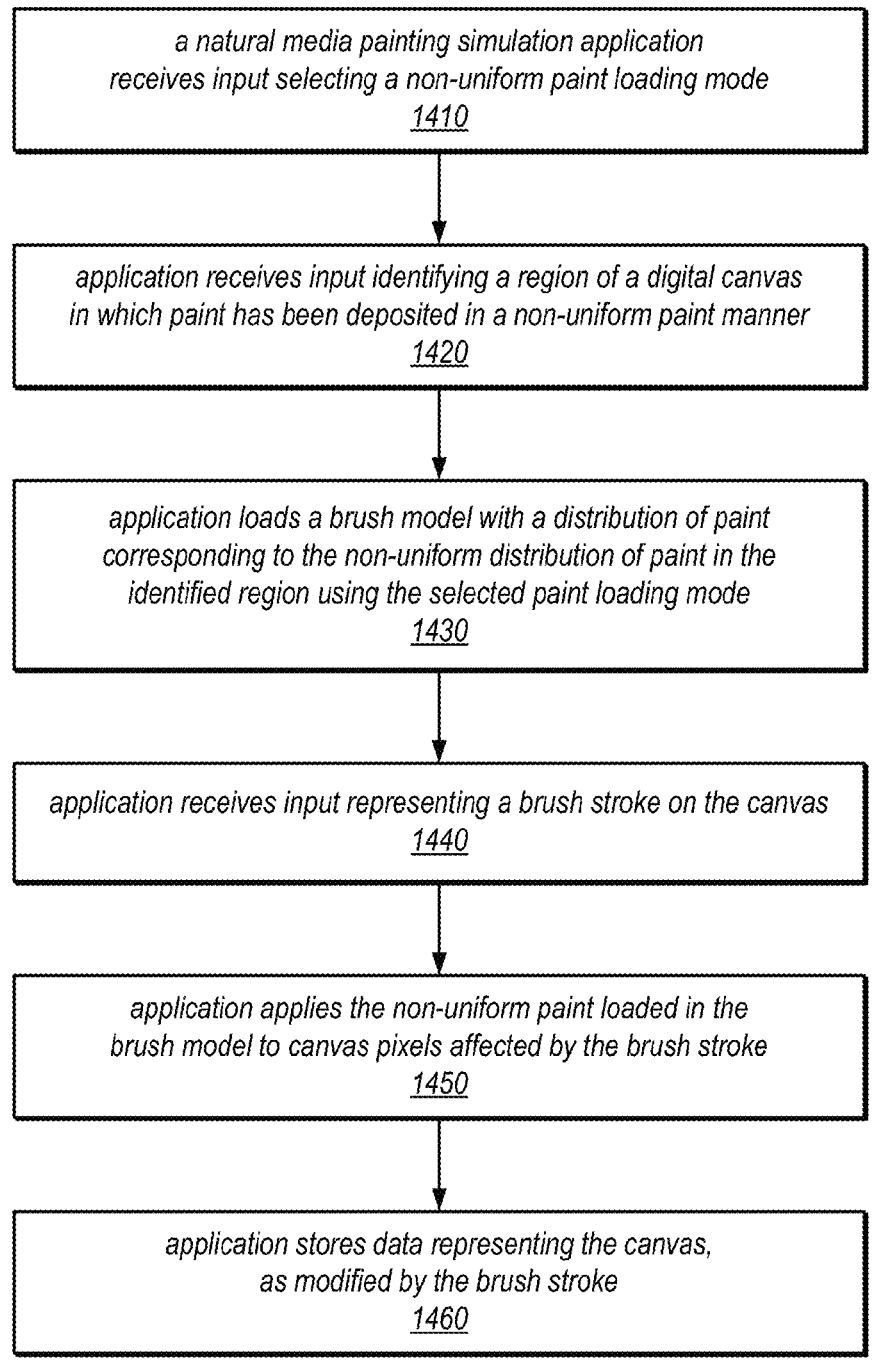
FIG. 14 is a flow diagram illustrating one embodiment of a method for loading a digital paint brush with non-uniform colors from a digital canvas.

One embodiment of a method for loading a digital paint brush with non-uniform colors from a digital canvas is illustrated by the flow diagram in FIG. 14. As illustrated in this example, the method may include a natural media painting simulation application receiving input selecting a non-uniform paint loading mode, as in 1410. For example, in some embodiments, the application may support one or more optional (i.e. selectable) non-uniform paint loading modes. The method may include the application receiving input identifying a region of a digital canvas in which paint has been deposited in a non-uniform manner, as in 1420. For example, a user may select a region of the digital canvas (e.g., using a selection mechanism of a graphical user interface) in which paint has been deposited using multiple brush strokes such that the color, opacity, and/or other parameters of the paint in the region are non-uniform.

As illustrated at 1430, the method may include the application loading a brush model with a distribution of paint corresponding to the non-uniform distribution of paint in the identified region of the canvas. As described in more detail below, the particular actions taken by the application during the non-uniform paint loading operation may be dependent on the selected non-uniform paint loading mode. In some embodiments in which a brush model includes a reservoir buffer and a pickup buffer, the non-uniform paint loading may load cells of the reservoir buffer with paint having the color and/or characteristics of respective canvas cells in the identified region. After loading the brush model with the non-uniform paint, the application may receive input representing a brush stroke on the canvas, as in 1440. In response to this input, the method may include the application applying the non-uniform paint loaded in the brush model to canvas pixels affected by the brush stroke, as in 1450. For example, paint may be deposited from the reservoir buffer (which may store a non-uniform distribution of paint loaded using the selected non-uniform paint loading mode) and/or a pickup buffer (which may store paint having one or more colors and/or characteristics that was picked up by the brush model during this or a previous brush stroke) and mixed with any paint already present in canvas pixels over which the brush stroke sweeps. In some embodiments, the application may store data representing the digital canvas, as modified by the brush stroke (as in 1460).

Figure 15:
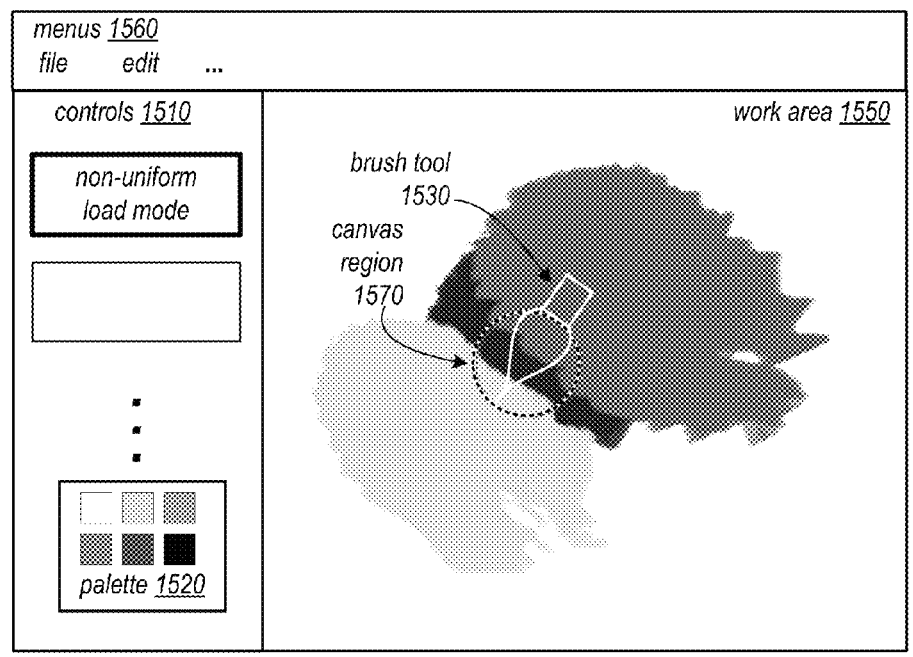
FIG. 15 illustrates one embodiment of a user interface through which a digital brush is loaded with non-uniform colors by directly sampling a portion of a digital image.

FIG. 15 illustrates one embodiment of a user interface in a digital painting application through which a digital brush is loaded with non-uniform colors by directly sampling a portion of a digital image. In this example, the user interface is divided into three regions or areas: menus 1560, controls 1510 (which includes palette 1520), and work area 1550. In this example, controls 1510 may include one or more user-modifiable controls, such as buttons, slider bars, dials, pop-up menus, pull-down menus, alphanumeric text entry boxes, etc., for specifying various parameters of the painting functions to be applied to a digital canvas. In this example, a button (labeled "non-uniform load mode") has been selected to enable or invoke a non-uniform paint loading mode for the painting application. This is shown by the bold outline around the "non-uniform load mode" button in controls area 1510. In some embodiments, two or more non-uniform paint loading modes may be provided and/or selectable in the application (e.g., a single-fill paint loading mode, and a continuous-fill paint loading mode). In other embodiments, slider bars may be used to specify values (or relative values) of other configurable parameters of a painting function, such as an amount of ink, a pigment concentration amount, a transparency value, a brush type, a brush width, a bristle stiffness, or other parameters that are to be applied when using brush tool 1530 to apply paint on the digital canvas being edited in work area 1550. Various methods of specifying values of any of the parameters used in simulating painting effects (i.e. methods other than those illustrated in FIG. 15) may be used in other embodiments. In some embodiments, slider bars or another input mechanism in controls area 1510 may be used to override a pre-set or default value of one or more of the parameters used in the digital painting application. Other optional tools may be included in the user interface in various embodiments, such as an eraser function, a reset function, or an "undo" tool that undoes the most recent user action in the work area 1550.

In the example illustrated in FIG. 15, menus 1560 may include one or more menus, for example menus used to navigate to other displays in the painting application, open files, print or save files, undo/redo actions, and so on. In this example, work area 1550 is the area in which an image on a digital canvas that is being created or edited is displayed as various digital painting operations are performed. In various embodiments, work area 1550 may display a portion or all of a digital canvas to which paint is to be added, or a portion or all of a previously existing digital canvas being modified by adding paint, as described herein.

As described herein, in some embodiments the digital painting application may allow the user to load a brush model with non-uniform colors by directly sampling the digital canvas on which they are painting. For example, the user may hover a brush tool over a desired distribution of color on the canvas, and may load those colors into the brush tool for use in subsequent painting operations. In some embodiments, the user may move the brush to a desired location so that the brush hovers over the region of the canvas from which the user desires to sample a set of non-uniform colors. In the example user interface illustrated in FIG. 15, work area 1550 illustrates a digital painting session in progress. In this example, the user is causing a brush tool 1530 to hover over a region 1570 of a digital canvas from which a non-uniform distribution of paint may be loaded.

In some embodiments, in response to a single user input (e.g., a single click of a button, or a cursor control device), the application may sample the region on the canvas under the brush tool and may load the brush with the selected color(s). In some embodiments, the reservoir buffer may be loaded to full capacity with the selected color(s) in response to the single user input. As previously noted, in some embodiments, the paint on the canvas and in the pickup buffer may not be affected by this non-uniform paint loading operation, i.e. the sampled paint may remain on the canvas in its current quantity, and no paint is loaded into the pickup buffer. In order to load a brush with color(s) sampled from the canvas, the user may invoke or enable a non-uniform paint loading mode, e.g., by holding down a modifier key while clicking a button or cursor control device, or alternatively by invoking or enabling a non-uniform paint loading mode via a user interface element dedicated for that purpose.

Figure 16:
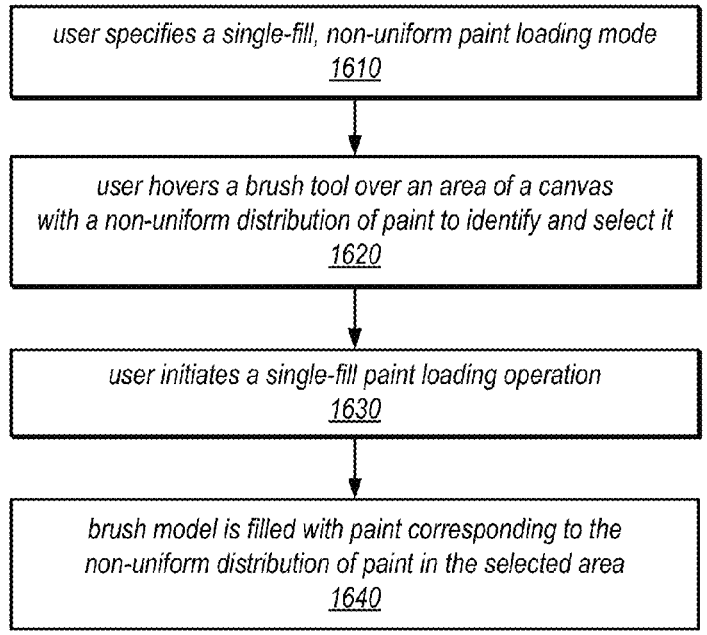
FIG. 16 is a flow diagram illustrating one embodiment of a method for loading paint from a canvas region under a brush tool using a single-fill, non-uniform paint loading mode.

FIG. 16 is a flow diagram illustrating one embodiment of a method for loading paint from a portion of a digital canvas under a brush tool using a single-fill, non-uniform paint loading mode. As illustrated at 1610, the method may include a user specifying the use of a single-fill, non-uniform paint loading mode. In some embodiments, this single-fill, non-uniform paint loading mode may be selectable using a check box, pull-down menu, or cursor control mechanism. In some embodiments, the single-fill, non-uniform paint loading mode may be one of two or more non-uniform paint loading modes that is supported in the painting application and that are selectable by the user. As illustrated at 1620, the method may include the user causing a brush tool to hover over an area of the canvas on which a non-uniform distribution of paint has been deposited. For example, the user may use a mouse, touch pad, or track ball to position a brush tool over a selected portion of the digital canvas while the single-fill, non-uniform paint loading mode is enabled.

As illustrated in this example, the method may include the user initiating a single-fill, paint loading operation while the brush tool is positioned over the selected area, as in 1630. For example, in one embodiment, the user may click a cursor control device button to select the area and then may release the cursor control device button to initiate the load operation. The application may then fill the brush model with paint corresponding to the non-uniform distribution of paint in the selected area, as in 1640. For example, in embodiments in which a brush model includes a reservoir buffer, paint having the color and characteristics of the paint in the region of the digital canvas under the brush tool may be loaded the region under the brush tool into corresponding respective cells of the reservoir buffer.

Figure 17:
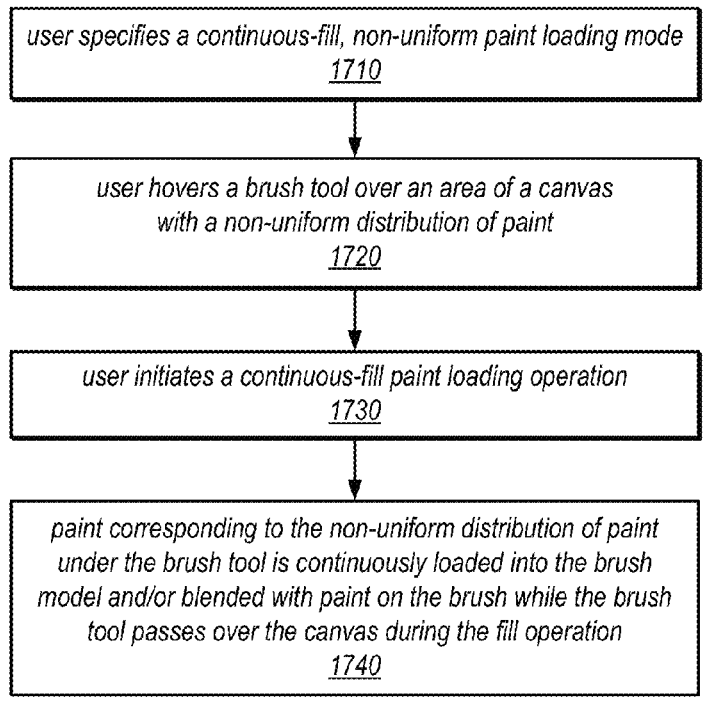
FIG. 17 is a flow diagram illustrating one embodiment of a method for loading paint from a canvas region under a brush tool using a continuous-fill, non-uniform paint loading mode.

In some embodiments, in response to a continuous user input (e.g., in response to a user depressing and holding a button while dragging the brush tool around on the digital canvas using a cursor control device), the user may continuously load the brush with the colors under the canvas. For example, the cells of the reservoir buffer corresponding to cells of the bristles in contact with the canvas may be loaded with paint from the canvas pixels that come in contact with those bristles as a series of samples is taken. In some embodiments, if the user moves the brush as they are loading paint from the canvas, the newly picked up paint may be continuously blended (or blurred) with the paint that has already been loaded into the brush to generate and store paint with color values reflecting this blending or blurring. FIG. 17 is a flow diagram illustrating one embodiment of a method for loading paint from a canvas region under a brush tool using such a continuous-fill, non-uniform paint loading mode. As illustrated at 1710, the method may include a user specifying the use of a continuous-fill, non-uniform paint loading mode. In some embodiments, this continuous-fill, non-uniform paint loading mode may be selectable using a check box, pull-down menu, or cursor control mechanism. In some embodiments, the continuous-fill, non-uniform paint loading mode may be one of two or more non-uniform paint loading modes that is supported in the painting application and that are selectable by the user. As illustrated at 1720, the method may include the user causing a brush tool to hover over an area of the canvas on which a non-uniform distribution of paint has been deposited. For example, the user may use a mouse, touch pad, or track ball to position a brush tool over a selected portion of the digital canvas while the continuous-fill, non-uniform paint loading mode is enabled.

As illustrated in this example, the method may include the user initiating a continuous-fill, paint loading operation while the brush tool is positioned over the selected area, as in 1730. For example, the user may click a cursor control device button while the continuous-fill, non-uniform paint loading mode is enabled in order to initiate the loading operation. As illustrated at 1740, the application may then continuously load the brush model with paint corresponding to the non-uniform distribution of paint under the brush tool and/or may blend this paint with paint already on the brush while the brush tool passes over the digital canvas during the fill operation. For example, in one embodiment, the application may continuously load the brush model with paint corresponding to the non-uniform distribution of paint under the brush tool as the user drags the brush tool around over the digital canvas and holds the cursor control device button (i.e. until the user releases the cursor control device). In some embodiments, the application may continuously load paint having the color and characteristics of the paint in the region of the digital canvas under the brush tool into corresponding respective cells of a reservoir buffer of the brush model and may blend that newly loaded paint with the paint already present in the reservoir buffer (as described above) until the loading operation is terminated (e.g., by releasing a cursor control device) and/or until the reservoir buffer is full.

Using a digital painting application that employs the methods described above for the non-uniform loading of digital brushes, the user may, for example, continuously load new color, apply one or more brush strokes to paint with that color, load another set of non-uniform colors, and continue painting. In some embodiments, by using a modifier key or load mode setting to switch the state of the brush to enable or invoke a loading operation, the user may switch back and forth between a paint loading mode and a painting mode without having to manually define a set of colors to be loaded across the virtual brush each time they want to load a different set of non-uniform colors.

Figure 18A:
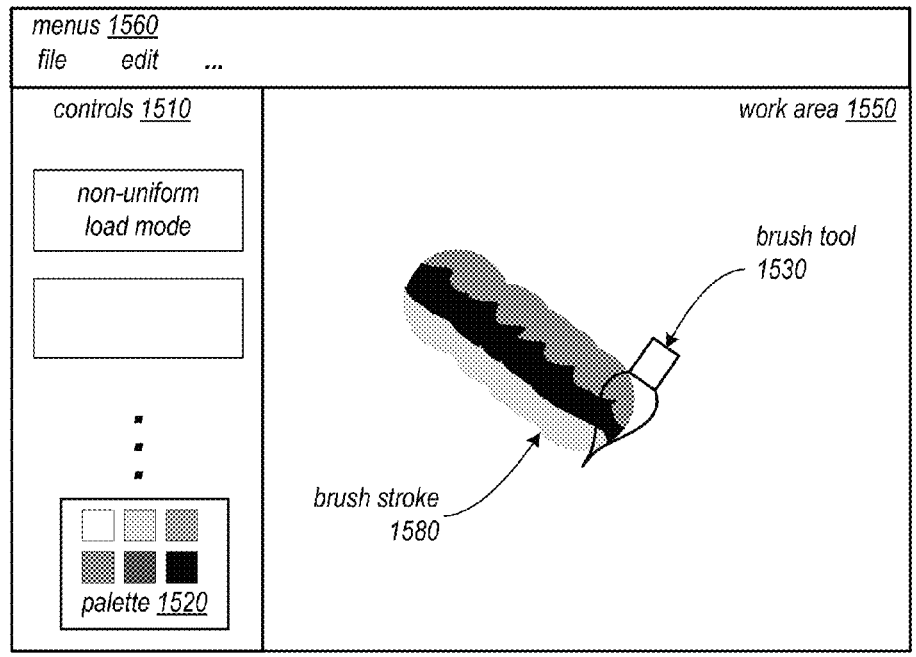
FIG. 18A illustrates the application of a non-uniform paint distribution in a system that employs a 2D stamp-based brush model, according to one embodiment.

Note that for any brush model, a painting simulation application may need to be able to determine the contact area between the virtual brush and the digital canvas at any given time. When the brush model is a 2D stamp-based model, the contact area may be defined by the area of the stamp. When the brush model is a bristle brush model, the contact area may be defined by the combination of locations on the digital canvas that are touched by one of the bristles. In some embodiments, the non-uniform paint loading operations described herein may, for the determined contact area, sample the colors on the digital canvas at the pixels that are in contact with the brush and load them into the brush model, whatever that brush model may be. Therefore, these operations may be applied with both static brush models and bristle brush models, among others. For example, FIG. 18A illustrates work area 1550 of the user interface illustrated in FIG. 15 following the performance of a non-uniform paint loading operation and a subsequent painting operation using the non-uniform paint loaded on the brush, according some embodiments. In this example, the non-uniform distribution of paint in canvas region 1570 illustrated in FIG. 15 was loaded into brush tool 1530 and used to apply a brush stroke 1580 on the digital canvas. In this example, the painting application employs a 2D stamp-based brush model, according to one embodiment. Therefore, the non-uniform distribution of paint sampled from the canvas was copied to the reservoir as a 2D stamp, i.e. the sampled paint defines a 2D stamp to be applied by the brush tool. As illustrated in FIG. 18A, brush stroke 1580 appears as a series of 2D stamps, each of which exhibits the non-uniform color distribution that was sampled in canvas region 1570.

Figure 18B:
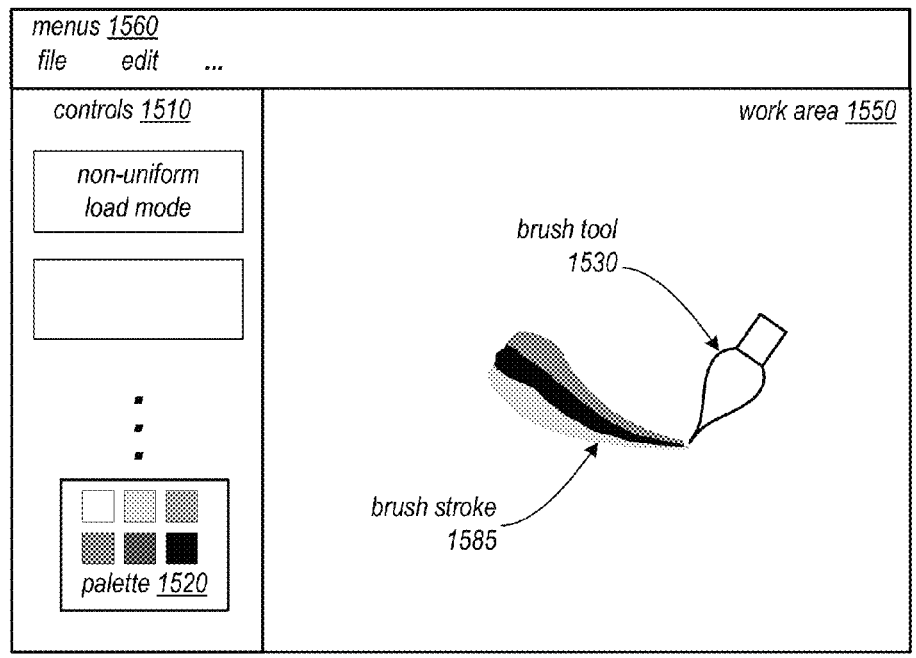
FIG. 18B illustrates the application of a non-uniform paint distribution in a system that employs a bristle brush model, according to one embodiment.

FIG. 18B illustrates work area 1550 of the user interface illustrated in FIG. 15 following the performance of a non-uniform paint loading operation and a subsequent painting operation using the non-uniform paint loaded on the brush, according to some embodiments. In this example, the non-uniform distribution of paint in canvas region 1570 illustrated in FIG. 15 was loaded into brush tool 1530 and used to apply a brush stroke 1585 on the digital canvas. In this example, the painting application employs a bristle brush model. In this example, various bristles of the bristle brush model have been loaded with different colors, according to the non-uniform color distribution that was sampled in canvas region 1570. In other words, the non-uniform paint that was sampled from the digital canvas was distributed across the bristles in the same manner that it was distributed across the sample. Consequently, brush stroke 1585 appears as a stroke of a bristle brush in which the stroke as a whole exhibits the non-uniform color distribution that was sampled in canvas region 1570.

Realistic simulation of natural media painting in a digital medium is compelling because it enables a wide variety of effects that are difficult to achieve with conventional digital painting tools. However, real (physical) paint media may be more difficult to manipulate than digital tools, and painting with real paint may take a considerable amount of time and practice to master. Some embodiments of the painting simulation modules described herein may leverage the capabilities of digital tools and techniques to ease the workflows and learning curves associated with natural media painting. For example, in some embodiments, methods and settings for automatic brush cleaning and brush filling may be provided to enable common but tedious natural media painting tasks to be automated in a digital painting tool.

Some embodiments of a painting simulation module may model a brush tip and the idea that paint loaded onto the brush tip is updated during strokes and when the painting color is set. In such embodiments, the user may perform a "clean" action, which may be analogous to dipping a physical paint brush in, e.g., turpentine or water, to remove the paint load, and a "fill" action, which may be analogous to dipping a physical paint brush into a well or paint on a palette, replenishing the paint on the brush. During the act of stroking with a virtual brush, the paint load may be depleted (and may eventually run out), and the brush tip may get dirty (picking up paint from the digital canvas), as happens with a real paint brush. The clean and fill actions may allow the user to manage the paint load between brush strokes for the desired stroke effect.

Some embodiments of a painting simulation module may provide two automated brush action options: an "auto clean" option and an "auto fill" option. When turned on or selected, these options may trigger automatic brush cleaning and filling actions between strokes, for example at the beginning of each new stroke. With these two options, there are four possible states for the painting simulation module, each corresponding to a common painting workflow. The use of these automated methods may improve user efficiency for common workflows in natural media painting simulations without requiring the user to learn an inordinate number of different tools, as may be the case with the methods provided by conventional digital painting tools and conventional painting simulation engines. In some embodiments, the use of these automated methods may bring a larger scope of natural media painting within the grasp of novice digital painters.

Figure 19:
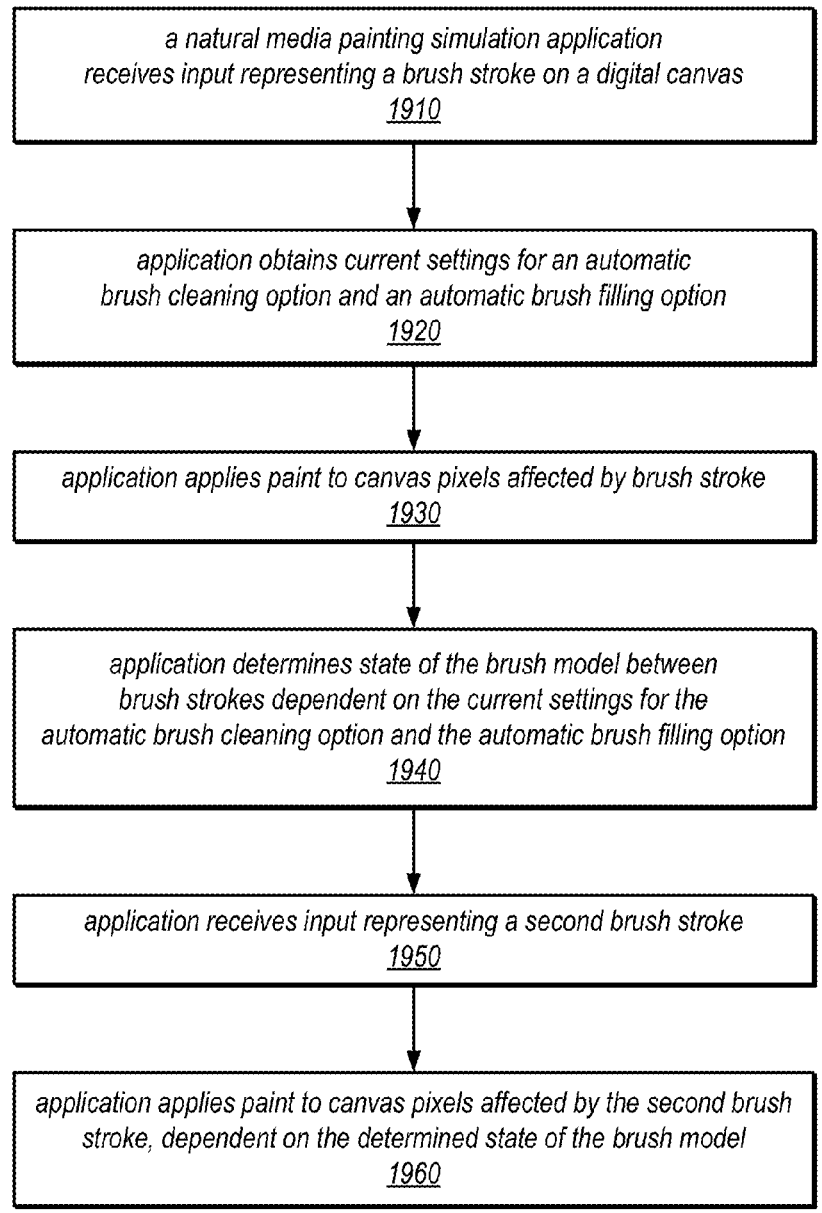
FIG. 19 is a flow diagram illustrating one embodiment of a method for simulating natural media brush strokes in a digital painting application that provides an automatic brush cleaning feature and an automatic brush filling feature.

FIG. 19 is a flow diagram illustrating one embodiment of a method for simulating natural media brush strokes in a digital painting application that provides an automatic brush cleaning feature and an automatic brush filling feature. As illustrated in this example, the method may include the natural media painting simulation application receiving input representing a brush stroke on a digital canvas, as in 1910. The method may also include the application obtaining current settings for an automatic brush clean option and an automatic brush filling option, as in 1920. For example, in some embodiments, the current settings may correspond to default settings that may be obtained from a memory in which they are stored. In other embodiments, one or more user interface elements, such as check boxes, menu options, etc., may be provided via which a user may set or change the values of one or more of the settings. One such user interface is described in more detail below. As illustrated at 1930, the method may include the application applying paint to pixels of the digital canvas that are affected by the brush stroke (e.g., canvas pixels over which a brush tool sweeps to define the brush stroke).

As illustrated in this example, the application may then determine the state of the brush model between brush strokes dependent on the current settings for the automatic brush cleaning option and the automatic brush filling option, as in 1940. For example, if the automatic cleaning option is enabled, the application may clean the brush model prior to applying any additional brush strokes. Similarly, if the automatic filling option is enabled, the application may re-load the brush model with additional paint prior to applying any additional brush strokes. If the application receives input representing a second brush stroke, as in 1950, the application may apply paint to the canvas pixels affected by the second brush stroke (as in 1960) and the appearance of the second brush stroke may be dependent on the determined state of the brush model between the first and second brush strokes.

As noted above, embodiments that include two automatic brush action options may be in one of four possible states, each of which may correspond to a common painting workflow. FIGS. 20A through 23B illustrate portions of example user interfaces (similar to those illustrated in FIG. 15, and in FIGS. 18A and 18B) that provide user interface elements to enable or disable an automatic brush cleaning mode and an automatic brush filling mode, according to some embodiments.

Figure 20A:
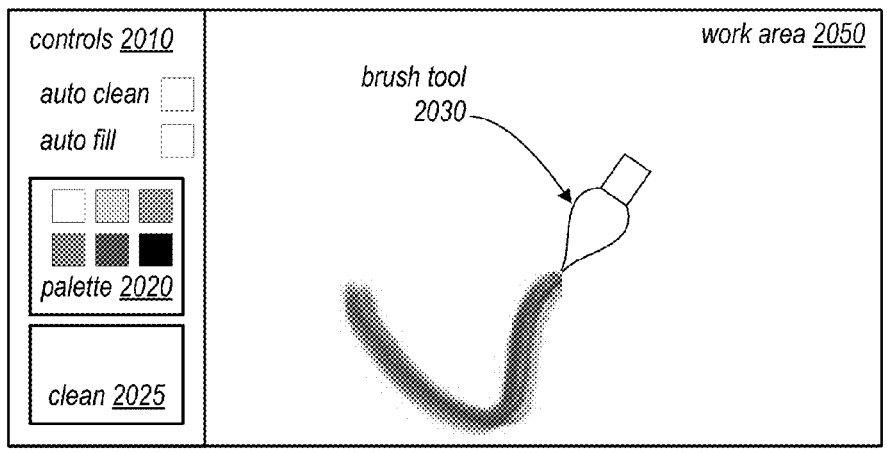
FIGS. 20A through 20C illustrate the application of brush strokes in a natural media painting simulation in which both an automatic brush cleaning feature and an automatic brush filling feature are off (disabled), according to some embodiments.
Figure 20B:
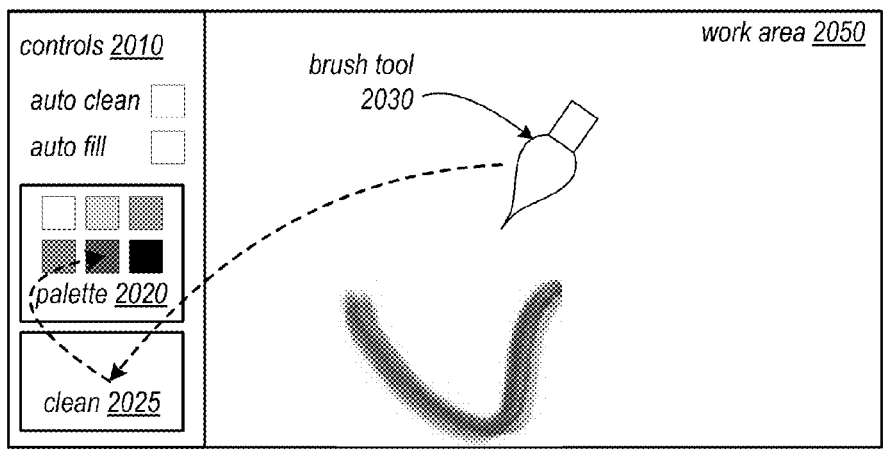
Figure 20C:
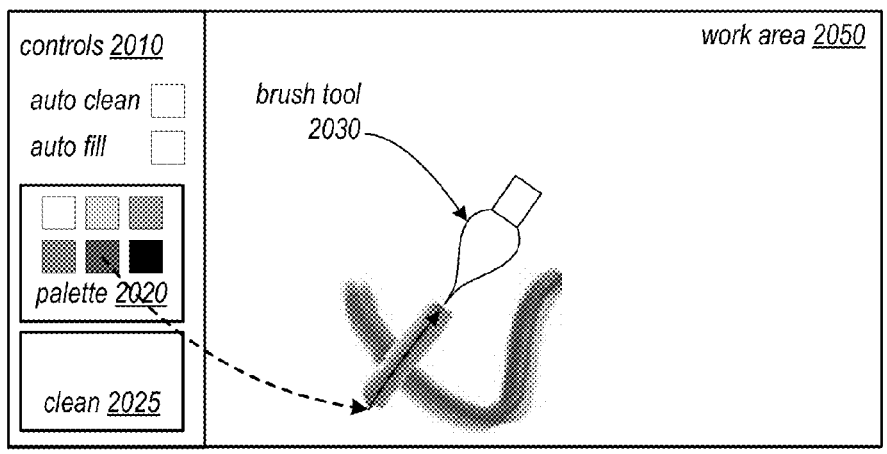

FIGS. 20A through 20C illustrate the application of brush strokes in a natural media painting simulation application in which both an automatic brush cleaning feature and an automatic brush filling feature are off (disabled), according to some embodiments. In this state the behavior of a brush tool may be equivalent to that of a real (i.e. physical) paint brush, and the actions taken by a user to apply a series of brush strokes when the application is in this state may be similar to those taken by an artist painting with a physical paint brush. For example, when the application is in this state, the user may manually control the cleaning and filling of the brush as necessary or desired, similar to the way a painter would use turpentine and/or water and a physical paint palette to clean and load a physical paint brush between strokes, when necessary or desired. When the application is in this state, if the brush gets dirty, the user may choose to leave it dirty or to clean it, depending on the desired effect. Similarly, if the paint is running out, the user may choose to let it run out, and may even continue "painting" with a dry brush (e.g., to create streaks of paint on a wet canvas), or the user may choose to refill the brush with paint at any time. Many types of paint effects may require this level of full, manual control. For example, the user may chose to deposit some paint to be mixed on the canvas that will shortly dry out and then be blended with the surrounding paints, e.g., to add highlights or touches of color. In another example, if the user wishes to perform multiple stroke tasks with varying brush loads, this mode may allow them to control the variation of the load between each pair of strokes.

FIG. 20A illustrates an example user interface of a digital painting application that includes user interface elements selectable to enable or disable an automatic brush cleaning mode and an automatic brush filling mode, according to some embodiments. In this example, two regions or areas of the user interface are illustrated: controls 2010, and work area 2050. In this example, controls 2010 may include one or more user-modifiable controls, such as slider bars, dials, pop-up menus, pull-down menus, alphanumeric text entry boxes, etc., for specifying various parameters of the painting functions to be applied to a digital canvas.

In this example user interface, a "clean" user interface element is provided by which a user may manually clean a brush if and when desired, and a color palette is also provided by which a user may manually load a brush with paint if and when desired. For example, controls area 2010 includes a user interface element 2025 (labeled "clean") that is selectable to request or invoke a manual brush cleaning operation (e.g. a brush cleaning operation that is performed on demand in response to selection of user interface element 2025 in controls area 2010). Controls area 2010 also includes palette 2020, elements of which may be "tapped" by the user using brush tool 2030 to request or invoke a manual brush filling operation (e.g., an operation in which brush tool 2030 is loaded with a paint selected from palette 2020 in response to selection of one of the user interface elements of palette 2020 in controls area 2010). In this example, a user interface element (e.g., a check box) is provided by which a user may enable or disable an automatic brush cleaning feature, and another user interface element (e.g., a check box) is provided by which a user may enable or disable an automatic brush filling feature.

In other embodiments, slider bars may be used to specify values (or relative values) of other configurable parameters of a painting function, such as an amount of ink, a pigment concentration amount, a transparency value, a brush type, a brush width, a bristle stiffness, or other parameters that are to be applied when using brush tool 2030 to apply paint on the digital canvas being edited in work area 2050. Various methods of specifying values of any of the parameters used in simulating painting effects (i.e. methods other than those illustrated in FIG. 20A) may be used in other embodiments. In some embodiments, slider bars or another input mechanism in controls area 2010 may be used to override a pre-set or default value of one or more of the parameters used in the digital painting application. Other optional tools may be included in the user interface in various embodiments, such as an eraser function, a reset function, or an "undo" tool that undoes the most recent user action in the work area 2050.

In the example illustrated in FIG. 20A, work area 2050 is the area in which an image on a digital canvas that is being created or edited is displayed as various digital painting operations are performed. In various embodiments, work area 2050 may display a portion or all of a digital canvas to which paint is to be added, or a portion or all of a previously existing digital canvas being modified by adding paint, as described herein. In the example illustrated in FIG. 20A, work area 2050 illustrates a digital painting session in progress, in which a brush tool 2030 has been used to paint a brush stroke on a digital canvas. Note that in this example, both the automatic brush cleaning mode and the automatic brush filling mode are off (i.e. disabled). This is illustrated in FIGS. 20A-20C by the empty checkboxes for these features in controls area 2010.

FIG. 20B illustrates the application of a manual brush cleaning operation and a manual brush filling operation prior to the application of an additional brush stroke on the digital canvas displayed in work area 2050 of the user interface illustrated in FIG. 20A. In this and the other examples that follow, the dashed arrows represent the motion of a brush tool to invoke various functions of the digital painting application. For example, in FIG. 20B, the dashed arrows indicate that in order to invoke a manual brush cleaning operation and a manual brush filling operation, the user moved brush tool 2030 to select the "clean" user interface element 2025 in controls area 2010 (e.g., by clicking a cursor control button), and then moved brush tool 2030 to select one of the user interface elements on palette 2020 of controls area 2010 (e.g., by clicking a cursor control button to select a paint color from palette 2020). In response to these actions by the user, the painting application first cleaned brush tool 2030, and then loaded brush tool 2030 with the selected paint.

FIG. 20C illustrates the application of an additional brush stroke on the digital canvas displayed in work area 2050 of the user interface illustrated in FIG. 20A following performance of the manual brush cleaning operation and a manual brush filling operation depicted in FIG. 20B and described above. In FIG. 20C, the dashed arrow indicates that in order to apply the additional brush stroke, the user moved brush tool 2030 from the selected user element of palette 2020 of controls area 2010 to the digital canvas displayed in work area 2050 and then applied a brush stroke of the selected paint to the canvas.

Figure 21A:
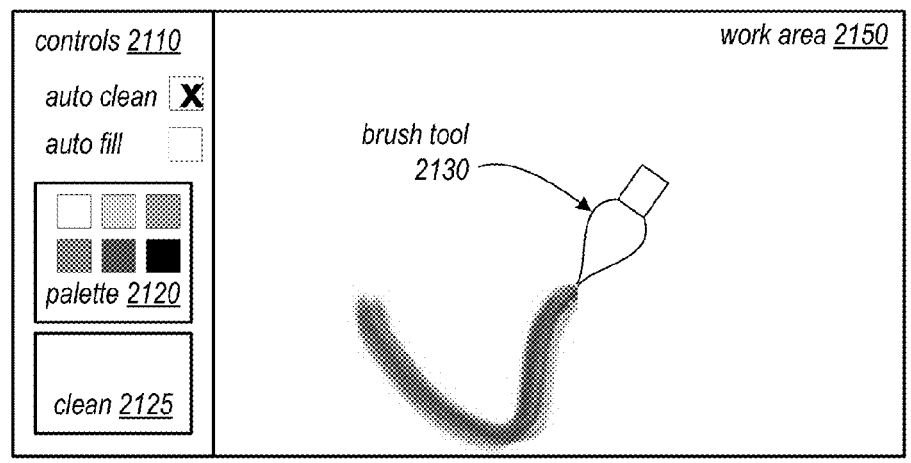
FIGS. 21A through 21C illustrate the application of brush strokes in a natural media painting simulation in which an automatic brush cleaning feature is on (enabled) and an automatic brush filling feature is off (disabled), according to some embodiments.
Figure 21B:
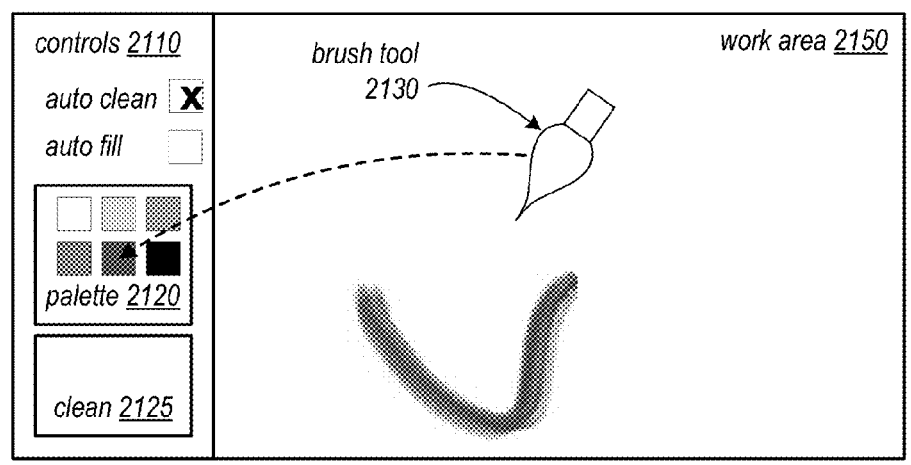
Figure 21C:
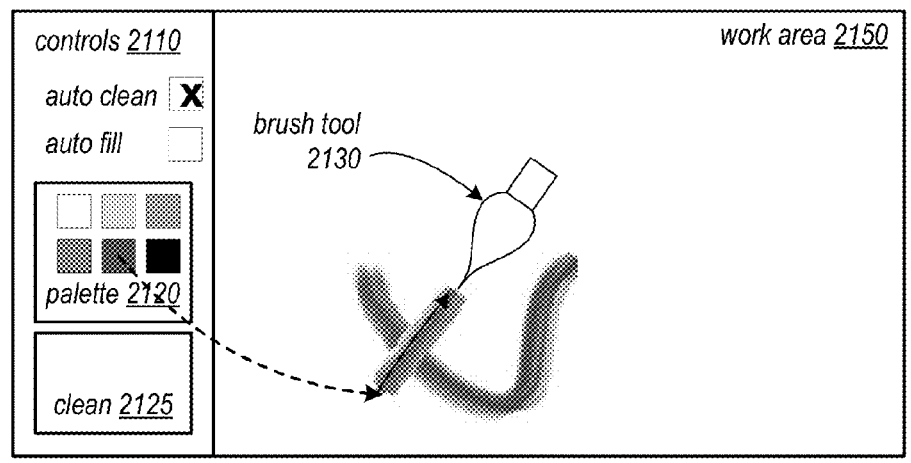

In oil painting and other physical painting applications, blending of paint on the canvas to create smooth gradients is a common and important task. For example, a clean fan brush may be flicked back and forth across a boundary between two high-contrast colors to create a smooth gradient between them. Effective blending requires cleaning the brush between strokes so that each stroke simply picks up paint on the canvas and moves it nearby, without depositing new paint or moving paint large distances across the canvas (e.g., without picking up paint from a stroke in one portion of the canvas, and then depositing it in a new area). A digital painting application that provides an optional automatic brush cleaning mode may be useful for recreating such blending operations in the digital world without having to learn new tools, interfaces, or actions. For example, if a virtual brush is automatically cleaned between strokes, the strokes made with the clean brush may be used to blend paints as if they were blended with a smudge tool that adds no paint to the digital canvas. FIGS. 21A through 21C illustrate the application of brush strokes in a natural media painting simulation application in which an automatic brush cleaning feature is on (enabled) and an automatic brush filling feature is off (disabled), according to some embodiments. When the painting application is in this state, the automatic brush cleaning feature may be used to automatically clean the brush between strokes (i.e. without the user having to take action to manually clean the brush by selecting the "clean" button in controls area 2120), so that the brush is empty of all paint at the beginning of each new stroke, and so that no new colors are introduced by each new stroke.

FIG. 21A illustrates an example user interface of a digital painting application that is similar to that illustrated in FIGS. 20A-20C and described above. As in the previous example, the user interface includes user interface elements selectable to enable or disable an automatic brush cleaning mode and an automatic brush filling mode. Again, two regions or areas of the user interface are illustrated as controls area 2110, and work area 2150. These areas are similar to the regions of the user interface illustrated in FIGS. 20A-20C, and may include similar tools and/or functionality.

In the example illustrated in FIG. 21A, work area 2150 is the area in which all or a portion a digital canvas is displayed as various digital painting operations are performed. In the example illustrated in FIG. 21A, work area 2150 illustrates a digital painting session in progress, in which a brush tool 2130 has been used to paint a brush stroke on a digital canvas. Note that in this example, the automatic brush cleaning mode is on (enabled) and the automatic brush filling mode is off (i.e. disabled). This is illustrated in FIGS. 21A-21C by the checked "auto clean" box and the unchecked "auto fill" box in controls area 2110. Therefore, in this example, at some point after completing the application of the brush stroke illustrated in FIG. 21A and prior to the application of a next brush stroke, the digital painting application automatically cleans brush tool 2130.

Note that the automatic brush cleaning operation described herein may in some embodiments be performed in response to the completion of a current brush stroke (e.g., in response to detecting a "mouse up" action at the end of a brush stroke). In other embodiments, the automatic brush cleaning operation may be performed in response to initiation of a next brush stroke (e.g., in response to detecting a "mouse down" action at the beginning of a brush stroke), or in response to initiation of a paint selection or manual paint loading operation (e.g., so that the brush is cleaned immediately prior to re-loading the brush with new paint). Note also that when an automatic brush cleaning mode is enabled, it may be overridden by the user by performing a manual brush filling operation to re-load the brush following the execution of the automatic brush cleaning operation.

FIG. 21B illustrates the application of a manual brush filling operation prior to the application of an additional brush stroke on the digital canvas displayed in work area 2150 of the user interface illustrated in FIG. 21A. In this example, the manual brush filling operation is performed after the brush tool has been automatically cleaned, in order to refill it with paint for one or more subsequent brush strokes. As described herein, in other embodiments a manual brush filling operation may be performed prior to an automatic brush cleaning operation. As noted above, the dashed arrows represent the motion of a brush tool to invoke various functions of the digital painting application. For example, in FIG. 21B, the dashed arrow indicates that in order to invoke a manual brush filling operation, the user moved brush tool 2130 to select the one of the user interface elements on palette 2120 of controls area 2110 (e.g., by clicking a cursor control button to select a paint color from palette 2120). In response to this action by the user, the painting application loaded brush tool 2130 with the selected paint.

FIG. 21C illustrates the application of an additional brush stroke on the digital canvas displayed in work area 2150 of the user interface illustrated in FIG. 21A following performance of the automatic brush cleaning operation and the manual brush filling operation described above. In FIG. 21C, the dashed arrow indicates that in order to apply the additional brush stroke, the user moved brush tool 2130 from the selected user element of palette 2120 of controls area 2110 to the digital canvas displayed in work area 2150 and then applied a brush stroke of the selected paint to the canvas.

Frequently, painters want to paint dirty brush strokes or strokes with a complex non-uniform load, but each time the brush runs out of paint, it must be reloaded and dirtied to maintain the desired paint load. A digital painting application that includes an automatic brush filling mode may be used to re-create this real world workflow in a manner that is easier to implement than with real (physical) paint media and physical paint brushes. For example, a digital painting application in which an automatic brush filling mode is on (enabled), but an automatic brush cleaning mode is off (disabled) may simplify this workflow by automatically replenishing the paint load at the beginning of each stroke without changing the color or dirty state. This mode, combined with methods to control stroke drying, may enable a painter to create streaky, dirty brush strokes very easily that would be extremely tedious to produce with a real brush. When the application is this state, if the brush is dirty, it stays dirty, but it may be refilled after each brush stroke (e.g., the reservoir buffer of the brush model may be refilled) after each stroke.

Figure 22A:
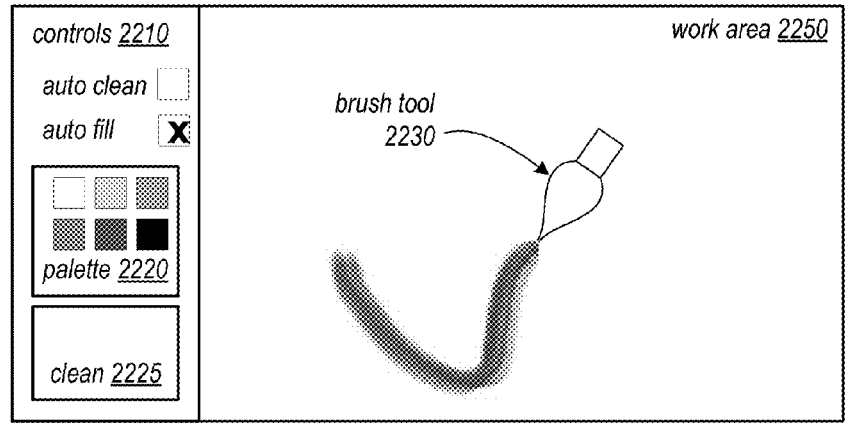
FIGS. 22A through 22C illustrate the application of brush strokes in a natural media painting simulation in which an automatic brush cleaning feature is off (disabled) and an automatic brush filling feature is on (enabled), according to some embodiments.
Figure 22B:
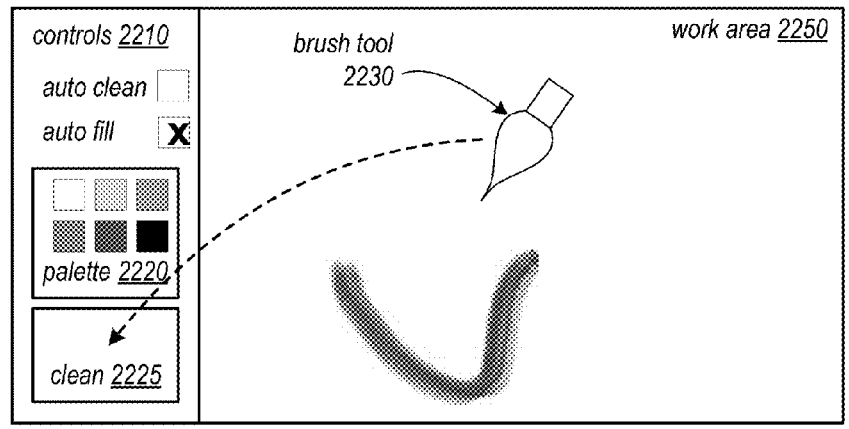
Figure 22C:
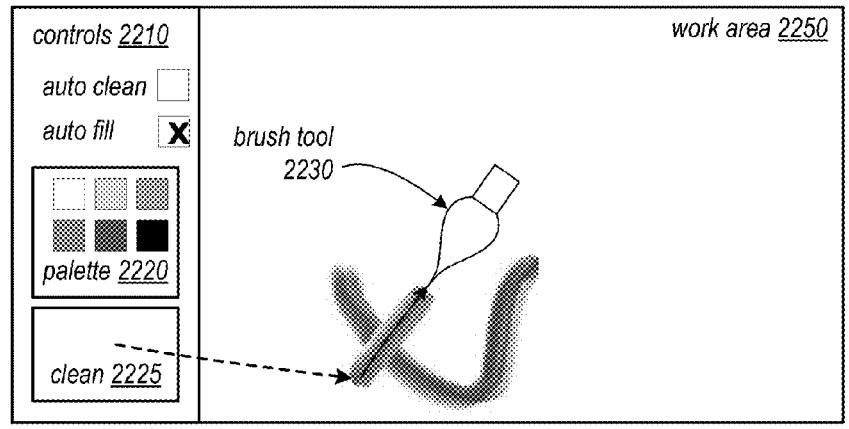

For example, if the value of a drying rate parameter is high (e.g., if the brush will run out of paint quickly), the user could paint a single stroke that runs out of paint, but may blend the stroke with surrounding paint, getting the brush dirty and making an interesting and complex color stroke. When the stroke is completed, the brush may be automatically refilled with more of the same paint that is on the dirtied brush at the completion of the stroke (without first cleaning it) so that the next stroke continues from that point on. In other words, for the next stroke, the brush is maintained in its dirty state, but more paint is added so that work may continue using the dirtied brush. This workflow may be difficult (if not impossible) to achieve in physical painting, but may be provided by the digital painting applications described herein to allow the user to create interesting effects, in some embodiments. FIGS. 22A through 22C illustrate the application of brush strokes in a natural media painting simulation application in which an automatic brush cleaning feature is off (disabled) and an automatic brush filling feature is on (enabled), according to some embodiments.

FIG. 22A illustrates an example user interface of a digital painting application that is similar to that illustrated in FIGS. 20A-20C and described above. As in the previous examples, the user interface includes user interface elements selectable to enable or disable an automatic brush cleaning mode and an automatic brush filling mode. Again, two regions or areas of the user interface are illustrated as controls area 2210, and work area 2250. These areas are similar to the regions of the user interface illustrated in FIGS. 20A-20C, and may include similar tools and/or functionality.

In the example illustrated in FIG. 22A, work area 2250 is the area in which all or a portion a digital canvas is displayed as various digital painting operations are performed. In the example illustrated in FIG. 22A, work area 2250 illustrates a digital painting session in progress, in which a brush tool 2230 has been used to paint a brush stroke on a digital canvas. Note that in this example, the automatic brush cleaning mode is off (disabled) and the automatic brush filling mode is on (i.e. enabled). This is illustrated in FIGS. 22A-22C by the unchecked "auto clean" box and the checked "auto fill" box in controls area 2210. Therefore, in this example, at some point after completing the application of the brush stroke illustrated in FIG. 22A and prior to the application of a next brush stroke, the digital painting application automatically fills brush tool 2230 (e.g., with a currently selected paint, or with additional paint having the same color or color distribution that was stored in brush tool 2230 at the beginning or at the end of the previous brush stroke, in different embodiments).

Note that the automatic brush filling operation described herein may in some embodiments be performed in response to the completion of a current brush stroke (e.g., in response to detecting a "mouse up" action at the end of a brush stroke). In other embodiments, the automatic brush filling operation may be performed in response to initiation of a next brush stroke (e.g., in response to detecting a "mouse down" action at the end of a brush stroke), e.g., so that the brush is re-filled with paint immediately prior to applying the next brush stroke. Note also that when an automatic brush filling mode is enabled, it may be overridden by the user by performing a manual brush cleaning operation to empty the brush following the execution of the automatic brush filling operation.

FIG. 22B illustrates the application of a manual brush cleaning operation prior to the application of an additional brush stroke on the digital canvas displayed in work area 2250 of the user interface illustrated in FIG. 22A. In this example, the manual brush cleaning operation is performed before the brush tool is automatically filled. For example, in some embodiments the automatic brush filling operation may be performed in response to the completion of a brush stroke, and may be repeated in response to completion of a manual brush cleaning operation, when the application is in this state. In this way, the next brush stroke will be applied using a brush that stores only freshly loaded paint. As described herein, in other embodiments a manual brush cleaning operation may be performed after an automatic brush cleaning operation. As noted above, the dashed arrows represent the motion of a brush tool to invoke various functions of the digital painting application. For example, in FIG. 22B, the dashed arrow indicates that in order to invoke a manual brush cleaning operation, the user moved brush tool 2230 to select the "clean" user interface element 2225 in controls area 2210 (e.g., by clicking a cursor control button). In response to this action by the user, the painting application cleaned brush tool 2230.

FIG. 22C illustrates the application of an additional brush stroke on the digital canvas displayed in work area 2250 of the user interface illustrated in FIG. 22A following performance of the manual brush cleaning operation and the automatic brush filling operation described above. In FIG. 22C, the dashed arrow indicates that in order to apply the additional brush stroke, the user moved brush tool 2230 from the selected user element of controls area 2210 to the digital canvas displayed in work area 2250 and then applied a brush stroke of the currently loaded paint to the canvas.

Figure 23A:
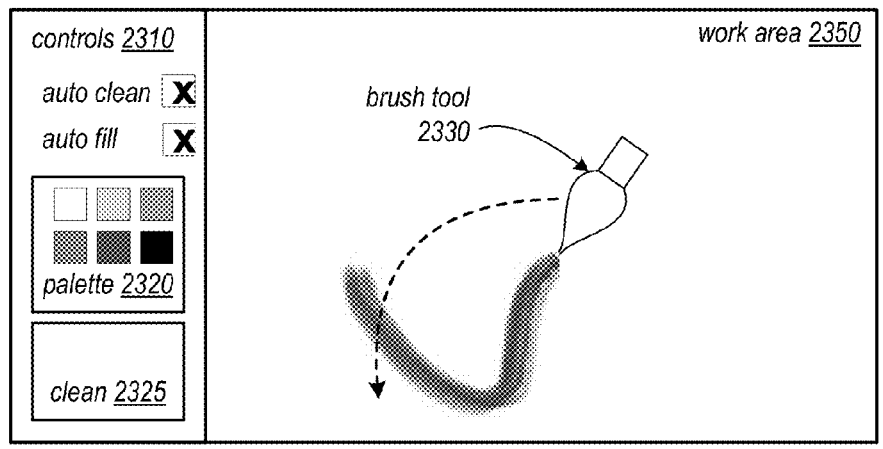
FIGS. 23A through 23B illustrate the application of brush strokes in a natural media painting simulation in which both an automatic brush cleaning feature and an automatic brush filling feature are on (enabled), according to some embodiments.
Figure 23B:
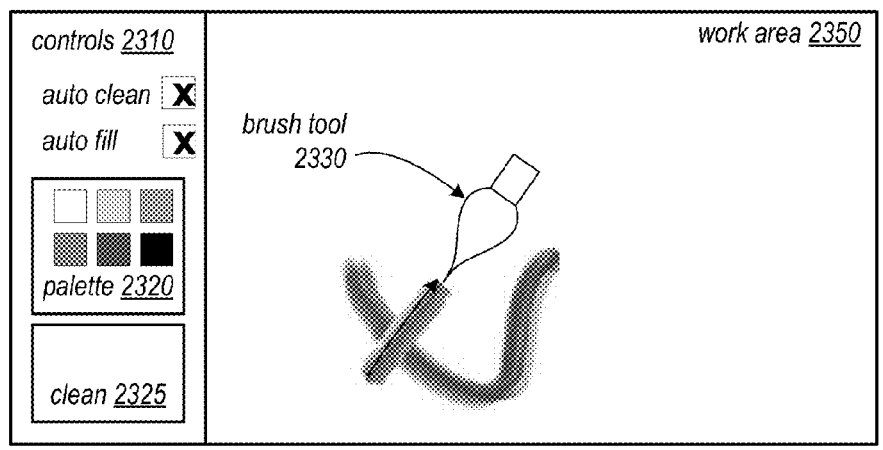

A common use case for real world painting tasks may be getting color and detail down on the canvas as quickly as possible, e.g., using a series of clean, fresh brush strokes. Real painters may work in this mode frequently enough to develop techniques whereby they can clean and reload the paint brush between each pair of brush strokes without taking their eyes off the canvas, but novice painters can struggle with this mode. A digital painting application that includes an automatic brush cleaning mode and an automatic brush filling mode may be used to re-create this real world workflow in a manner that is easier to implement than with real (physical) paint media and physical paint brushes, and may alleviate the burden on new users of developing such techniques. For example, when both the automatic brush cleaning mode and the automatic brush filling mode are on (enabled), at each stroke, the digital brush may be effectively and automatically cleaned (which may be analogous to a physical brush being dipped in turpentine or water), and then may be automatically filled with a previously selected color on the palette. This mode may provide a clean, fresh brush each stroke that will make consistent length marks with a consistent color every time, while still allowing the digital brush to get dirty and the paint on the digital brush to blend with nearby colors during the stroke. FIGS. 23A through 23B illustrate the application of brush strokes in a natural media painting simulation application in which both an automatic brush cleaning feature and an automatic brush filling feature are on (enabled), according to some embodiments.

FIG. 23A illustrates an example user interface of a digital painting application that is similar to that illustrated in FIGS. 20A-20C and described above. As in the previous examples, the user interface includes user interface elements selectable to enable or disable an automatic brush cleaning mode and an automatic brush filling mode. Again, two regions or areas of the user interface are illustrated as controls area 2310, and work area 2350. These areas are similar to the regions of the user interface illustrated in FIGS. 20A-20C, and may include similar tools and/or functionality.

In the example illustrated in FIG. 23A, work area 2350 is the area in which all or a portion a digital canvas is displayed as various digital painting operations are performed. In the example illustrated in FIG. 23A, work area 2350 illustrates a digital painting session in progress, in which a brush tool 2330 has been used to paint a brush stroke on a digital canvas. Note that in this example, both the automatic brush cleaning and the automatic brush filling mode are on (i.e. enabled). This is illustrated in FIGS. 23A-23B by the checked "auto clean" box and the checked "auto fill" box in controls area 2310. Therefore, in this example, at some point after completing the application of the brush stroke illustrated in FIG. 23A and prior to the application of a next brush stroke, the digital painting application automatically cleans brush tool 2330 and automatically fills brush tool 2330 (e.g., with a currently selected paint, or with additional paint having the same color or color distribution that was stored in brush tool 2330 at the beginning or at the end of the previous brush stroke, in different embodiments).

As noted above, the dashed arrow represents the motion of a brush tool to invoke various functions of the digital painting application. For example, in FIG. 23A, the dashed arrow indicates that in order to apply a next brush stroke, the user moved brush tool 2330 to a new position on the digital canvas displayed in work area 2350.

Note that the automatic brush cleaning and brush filling operations described herein may in some embodiments be performed in response to the completion of a current brush stroke (e.g., in response to detecting a "mouse up" action at the end of a brush stroke). In other embodiments, the automatic brush filling operation may be performed in response to initiation of a next brush stroke (e.g., in response to detecting a "mouse down" action at the end of a brush stroke), e.g., so that the brush is cleaned and then re-filled with paint immediately prior to applying the next brush stroke. In this example, an automatic brush cleaning operation is performed first, and then the brush tool is automatically filled. As described herein, in some embodiments a manual brush cleaning operation may be performed after an automatic brush cleaning operation in order to override the automatic brush filling operation (e.g., if the user wishes to load a different paint onto the brush before continuing with the currently selected automated options).

FIG. 23B illustrates the application of the next brush stroke on the digital canvas displayed in work area 2350 of the user interface illustrated in FIG. 23A following performance of the automatic brush cleaning and brush filling operations described above.

Figure 24:
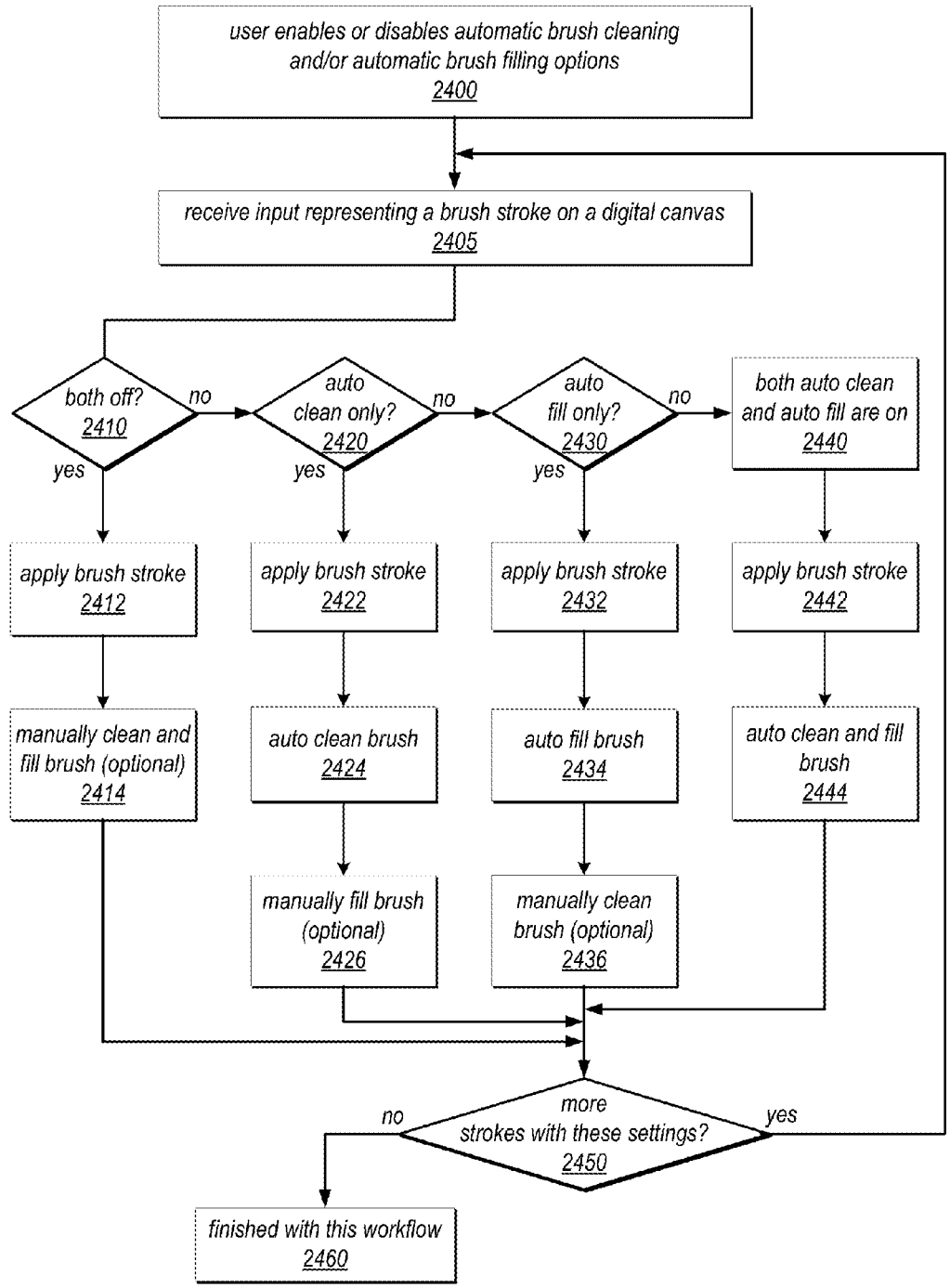
FIG. 24 is a flow diagram illustrating one embodiment of a method for simulating natural media brush strokes in a digital painting application using different combinations of an automatic brush cleaning feature and an automatic brush filling feature.

A more detailed flow diagram illustrating one embodiment of a method for simulating natural media brush strokes in a digital painting application using different combinations of an automatic brush cleaning feature and an automatic brush filling feature is illustrated in FIG. 24. As illustrated at 2400, the method may include a user enabling and/or disabling an automatic brush cleaning option and/or an automatic brush filling option of a digital painting application. In some embodiments, the current option settings may correspond to default settings, or settings previously selected by the user or another user. In some embodiments one or more user interface elements, such as check boxes, menu options, etc., may be provided via which the user may set, override, or otherwise modify the current values of one or more of the option settings to enable or disable one or both of the options. As illustrated at 2405, the method may include the application receiving input representing a brush stroke on a digital canvas.

As illustrated in this example, the actions taken in response to this input and the state of a brush model of the painting application may be dependent on the current settings of these options. For example, if both the automatic brush cleaning option and the automatic brush filling option are off (i.e. disabled), shown as the positive exit from 2410, the method may include the application applying the brush stroke (as in 2412) but may not include the application automatically cleaning or filling the brush prior to applying any additional brush strokes. As illustrated in this example, even if both the automatic brush cleaning option and the automatic brush filling option are disabled, the application may allow the user to (optionally) clean and/or fill the brush model manually prior to applying any additional brush strokes, as in 2414. For example, the user may manually select a user interface element to invoke a "clean" function, and/or may manually select a palette or paint well user interface element to invoke a brush loading operation before beginning a next brush stroke, as desired.

As illustrated in FIG. 24, if the automatic brush cleaning option is on (i.e. enabled) and the automatic brush filling option are off (i.e. disabled), shown as the positive exit from 2420, the method may include the application applying the brush stroke (as in 2422), and automatically cleaning the brush (as in 2424) but may not include the application automatically filling the brush prior to applying any additional brush strokes. As illustrated in this example, even if the automatic brush filling option is disabled, the application may allow the user to (optionally) fill the brush model manually prior to applying any additional brush strokes, as in 2426. For example, the user may manually select a palette or paint well user interface element to invoke a brush loading operation before beginning a next brush stroke, as desired. In some such embodiments, the brush may be automatically cleaned prior to the user (optionally) manually filling the brush. In other embodiments, the brush may be automatically cleaned after the user (optionally) manually fills the brush.

As illustrated in FIG. 24, if the automatic brush cleaning option is off (i.e. disabled) and the automatic brush filling option is on (i.e. enabled), shown as the positive exit from 2430, the method may include the application applying the brush stroke (as in 2432), and automatically filling the brush prior to applying any additional brush strokes (as in 2434), but may not include the application automatically cleaning the brush. For example, the method may include the application automatically filling the brush with a currently selected color after the brush stroke is completed, and before beginning the next stroke. As illustrated in this example, even if the automatic brush cleaning option is disabled, the application may allow the user to (optionally) clean the brush model manually prior to applying any additional brush strokes, as in 2436. For example, the user may manually select a user interface element to invoke a "clean" function before beginning a next brush stroke, as desired. In some such embodiments, the brush may be automatically filled prior to the user (optionally) manually cleaning the brush. In other embodiments, the brush may be automatically filled after the user (optionally) manually cleans the brush.

As illustrated in FIG. 24, if both the automatic brush cleaning option and the automatic brush filling option are on (i.e. enabled), shown as 2440 in FIG. 24, the method may include the application applying the brush stroke (as in 2442), and then automatically cleaning and filling the brush prior to applying any additional brush strokes (as in 2444). In other words, the brush may be automatically cleaned and then re-filled with a currently selected color after the brush stroke is completed, and before applying a next brush stroke.

As illustrated in FIG. 24, is there are more brush strokes to be applied using the current settings of the automatic brush cleaning option and the automatic brush filling option, shown as the positive exit from 2450, the method may include repeating the operations illustrated as 2405-2450 for these additional strokes. In not, shown as the negative exit from 2450, the current workflow may be completed (i.e. the user may be finished working in this mode), as in 2460.

As noted above, the automatic brush cleaning and/or filling actions described herein may take place in response to the completion of a brush stroke (e.g., immediately following the completion of the stroke), in response to receiving input representing a next stroke (e.g., immediately prior to applying the next stroke), or at any other time between brush strokes, in different embodiments. In addition, the user may choose to override the default behavior of the application (according to the currently enabled automatic brush actions), by manually cleaning and/or filling the brush between strokes. For example, if both automatic brush cleaning and automatic brush filling are enabled, the user may override the default behavior and clean, fill, or clean and fill the brush following the completion of the automated brush actions. Note also that in embodiments in which paint loaded on the brush is modeled using a pickup buffer and a reservoir buffer, an automatic brush cleaning operation may empty both the reservoir buffer and the pickup buffer, while an automatic brush filling operation may fill only the reservoir buffer with paint.

FIG. 25 illustrates a painting simulation module that may implement one or more of the natural media painting simulation techniques described herein, according to some embodiments. Module 2520 may, for example, be implemented as or in a stand-alone application, as a module of or plug-in for an application, or as a library function, in different embodiments. Specific examples of applications in which various embodiments of painting simulation module may be implemented include, but are not limited to, Adobe® Photoshop® and Adobe® After Effects®. "Adobe", "Photoshop", and "After Effects" are either registered trademarks or trademarks of Adobe Systems Incorporated in the United States and/or other countries.

Module 2520 may, for example, implement one or more of a pickup and reservoir model for simulation of real paint deposition between a brush and a canvas, drying rate, canvas wetness, and/or pickup mix ratio settings for applying various painting effects using digital brushes, non-uniform loading of digital brushes, and automatic brush cleaning and/or brush filling modes for common natural media painting workflows, as described herein. In some embodiments, module 2520 may implement one or more other painting simulation methods or tools, or other digital image processing methods or tools. As illustrated in FIG. 25, module 2520 may receive as input one or more digital images 2510. For example, an input image 2510 that was previously created may be retrieved from memory for additional editing using any or all of the digital painting techniques described herein. In other cases, module 2520 may be used to create a new digital image using any or all of the digital painting techniques described herein. Module 2520 may receive user input 2512 according to one or more of the virtual painting methods described herein. In various embodiments, module 2520 may be used to edit the input image(s) 2510, according to user input 2512 received via user interface 2522, using one or more of the virtual painting methods described herein. For example, a user may enter input according to one or more of the virtual painting methods described herein to edit an image, and/or may activate other tools in order to further edit the image. In various embodiments, module 2520 may generate as output one or more modified images 2530. Output image(s) 2530 may, for example, be stored to a storage medium 2540, such as system memory, a disk drive, DVD, CD, etc.

As illustrated in FIG. 25, in some embodiments module 2520 may provide a user interface 2522 via which a user may interact with the module 2520, e.g., to perform one or more virtual painting operations, as described herein. For example, in some embodiments, the user interface may provide user interface elements whereby the user may set or select options, or set or modify the values of various parameters including, but not limited to, one or more of the drying rate, canvas wetness, and/or pickup mix ratio settings, and the automatic brush cleaning and filling modes as described herein. In some embodiments, the user interface may provide user interface elements whereby the user may load the brush with non-uniform paint from the canvas in various modes, as described herein.

Some embodiments may include a means for simulating brush strokes using a small set of physically meaningful parameters. For example, a painting simulation module may receive input indicating values of a drying rate parameter, a canvas wetness parameter and/or a pickup mix ratio, and may use these values to control the appearance of brush strokes made on a digital canvas by a virtual brush, as described herein. The painting simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input indicating values of a drying rate parameter, a canvas wetness parameter and/or a pickup mix ratio, and using these values to control the appearance of brush strokes made on a digital canvas by a virtual brush, as described herein. Other embodiments of the painting simulation module may be at least partially implemented by hardware circuitry and/or firmware stored, for example, in a non-volatile memory.

Some embodiments may include a means for modeling paint loading on a virtual brush using a pickup buffer and a reservoir buffer. For example, a paint load modeling module may model the paint stored in the belly of a virtual brush in a reservoir buffer, and may model the paint picked up and stored by the virtual brush during one or more brush strokes in a pickup buffer, such that each unit area of the virtual brush tip corresponds to one cell of the reservoir buffer and one cell of the pickup buffer, as described herein. The paint load modeling module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform modeling the paint stored in the belly of a virtual brush in a reservoir buffer, and modeling the paint picked up and stored by the virtual brush during one or more brush strokes in a pickup buffer, such that each unit area of the virtual brush tip corresponds to one cell of the reservoir buffer and one cell of the pickup buffer, as described herein. Other embodiments of the paint load modeling module may be at least partially implemented by hardware circuitry and/or firmware stored, for example, in a non-volatile memory.

Some embodiments may include a means for simulating paint deposition on a digital canvas using a virtual brush model that includes a pickup buffer and a reservoir buffer. For example, a paint deposition simulation module may receive input representing a brush stroke, may apply paint directly from at least one of a pickup buffer and a reservoir buffer of a brush model to digital canvas pixels affected by the brush stroke, and may store data representing the modified canvas pixels, as described herein. The paint deposition simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input representing a brush stroke, applying paint directly from at least one of a pickup buffer and a reservoir buffer of a brush model to digital canvas pixels affected by the brush stroke, and storing data representing the modified canvas pixels, as described herein. Other embodiments of the paint deposition simulation module may be at least partially implemented by hardware circuitry and/or firmware stored, for example, in a non-volatile memory.

Some embodiments may include a means for loading a non-uniform distribution of paint on a virtual brush. For example, a non-uniform paint loading module may receive input identifying a portion of a digital canvas on which a non-uniform distribution paint has been deposited, and may load a virtual brush model with a distribution of paint corresponding to the non-uniform distribution of paint in the identified portion of the canvas for subsequent deposition using the virtual brush, as described herein. The non-uniform paint loading module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input identifying a portion of a digital canvas on which a non-uniform distribution paint has been deposited, and loading a virtual brush model with a distribution of paint corresponding to the non-uniform distribution of paint in the identified portion of the canvas for subsequent deposition using the virtual brush, as described herein. Other embodiments of the non-uniform paint loading module may be at least partially implemented by hardware circuitry and/or firmware stored, for example, in a non-volatile memory.

Some embodiments may include a means for automatically cleaning a virtual paint brush. For example, an automatic brush cleaning module may, when an automatic brush cleaning feature is selectively enabled, automatically empty a reservoir buffer and/or a pickup buffer of a virtual brush model between brush strokes made with the virtual brush, as described herein. The automatic brush cleaning module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform, when an automatic brush cleaning feature is selectively enabled, automatically emptying a reservoir buffer and/or a pickup buffer of a virtual brush model between brush strokes made with the virtual brush, as described herein. Other embodiments of the automatic brush cleaning module may be at least partially implemented by hardware circuitry and/or firmware stored, for example, in a non-volatile memory.

Some embodiments may include a means for automatically filling a virtual paint brush. For example, an automatic brush filling module may, when an automatic brush filling feature is selectively enabled, automatically fill a reservoir buffer of a virtual brush model with a currently select paint or paint distribution between brush strokes made with the virtual brush, as described herein. The automatic brush filling module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform, when an automatic brush filling feature is selectively enabled, automatically filling a reservoir buffer of a virtual brush model with a currently select paint or paint distribution between brush strokes made with the virtual brush, as described herein. Other embodiments of the automatic brush filling module may be at least partially implemented by hardware circuitry and/or firmware stored, for example, in a non-volatile memory.

Some embodiments of the painting simulation applications and modules (such as painting simulation module 2520), and/or of the various painting simulation methods described herein may be executed on one or more computer systems, which may interact with various other devices. One such computer system is illustrated in FIG. 26. FIG. 26 illustrates one embodiment of a computer system 2600 that is configured to implement one or more of the painting simulation methods described herein, according to some embodiments. In different embodiments, computer system 2600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2600 includes one or more processors 2610 coupled to a system memory 2620 via an input/output (I/O) interface 2630. Computer system 2600 further includes a network interface 2640 coupled to I/O interface 2630, and one or more input/output devices 2650, such as cursor control device 2660 (e.g., mouse, trackball, touchpad, digital tablet and stylus, etc.), keyboard 2670, and display(s) 2680. In some embodiments, it is contemplated that embodiments may be implemented using a single instance of computer system 2600, while in other embodiments multiple such systems, or multiple nodes making up computer system 2600, may be configured to host different portions or instances of embodiments. For example, in one embodiment some elements may be implemented via one or more nodes of computer system 2600 that are distinct from those nodes implementing other elements.

In various embodiments, computer system 2600 may be a uniprocessor system including one processor 2610, or a multiprocessor system including several processors 2610 (e.g., two, four, eight, or another suitable number). Processors 2610 may be any suitable processor capable of executing instructions. For example, in various embodiments, processors 2610 may be general-purpose or embedded processors implementing any of a variety of instruction set architectures (ISAs), such as the x86, PowerPC, SPARC, or MIPS ISAs, or any other suitable ISA. In multiprocessor systems, each of processors 2610 may commonly, but not necessarily, implement the same ISA.

In some embodiments, at least one processor 2610 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2620 may be configured to store program instructions and/or data accessible by processor 2610. In various embodiments, system memory 2620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a painting simulation module are shown stored within system memory 2620 as program instructions 2625 and data storage 2635, respectively. In other embodiments, program instructions and/or data may be received, sent or stored upon different types of computer-accessible (e.g., computer readable) media or on similar media separate from system memory 2620 or computer system 2600. Generally speaking, a computer-accessible medium may include non-transitory storage media or memory media such as magnetic or optical media, e.g., disk or CD/DVD-ROM coupled to computer system 2600 via I/O interface 2630. Program instructions and data stored on a non-transitory computer-accessible storage medium may be transmitted by transmission media or signals such as electrical, electromagnetic, or digital signals, which may be conveyed via a communication medium such as a network and/or a wireless link, such as may be implemented via network interface 2640.

In one embodiment, I/O interface 2630 may be configured to coordinate I/O traffic between processor 2610, system memory 2620, and any peripheral devices in the device, including network interface 2640 or other peripheral interfaces, such as input/output devices 2650. In some embodiments, I/O interface 2630 may perform any necessary protocol, timing or other data transformations to convert data signals from one component (e.g., system memory 2620) into a format suitable for use by another component (e.g., processor 2610). In some embodiments, I/O interface 2630 may include support for devices attached through various types of peripheral buses, such as a variant of the Peripheral Component Interconnect (PCI) bus standard or the Universal Serial Bus (USB) standard, for example. In some embodiments, the function of I/O interface 2630 may be split into two or more separate components, such as a north bridge and a south bridge, for example. In addition, in some embodiments some or all of the functionality of I/O interface 2630, such as an interface to system memory 2620, may be incorporated directly into processor 2610.

Network interface 2640 may be configured to allow data to be exchanged between computer system 2600 and other devices attached to a network, such as other computer systems, or between nodes of computer system 2600. In various embodiments, network interface 2640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2650 may, in some embodiments, include one or more display terminals, keyboards, keypads, touchpads, scanning devices, voice or optical recognition devices, or any other devices suitable for entering or retrieving data by one or more computer system 2600. Multiple input/output devices 2650 may be present in computer system 2600 or may be distributed on various nodes of computer system 2600. In some embodiments, similar input/output devices may be separate from computer system 2600 and may interact with one or more nodes of computer system 2600 through a wired or wireless connection, such as over network interface 2640.

As shown in FIG. 26, memory 2620 may include program instructions 2625, configured to implement embodiments of a painting simulation module as described herein, and data storage 2635, comprising various data accessible by program instructions 2625. In one embodiment, program instructions 2625 may include software elements of embodiments of a painting simulation module or one or more painting simulation methods as illustrated in the above figures. For example, program instructions 2625 may include program instructions executable to implement one or more of a painting simulation module, a paint load modeling module, a paint deposition simulation module, a non-uniform paint loading module, an automatic brush cleaning module, or an automatic brush filling module, some of which may be sub-modules of one of the others, or a sub-module of another module or application. Data storage 2635 may include data that may be used in embodiments. For example, data storage 2635 may include one or more data structures storing data representing paint stored in a pickup buffer and/or reservoir buffer of a virtual brush, data representing paint stored in a digital canvas, data representing the values of one or more default, pre-set, or configurable parameters or option settings, and/or data representing input, intermediate, or output images accessible by various applications executing in the system. In other embodiments, other or different software elements and data may be included in memory 2620.

Those skilled in the art will appreciate that computer system 2600 is merely illustrative and is not intended to limit the scope of a painting simulation module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2600 may be transmitted to computer system 2600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the systems and methods described herein may be implemented using other computer system configurations.

Note that various embodiments of the systems and methods described herein may further include receiving, sending or storing instructions and/or data implemented in accordance with the foregoing description upon a computer-accessible medium. Generally speaking, a computer-accessible medium may include non-transitory storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may also include transmission media or signals such as electrical, electromagnetic, or digital signals, conveyed via a communication medium such as network and/or a wireless link.

The various methods as illustrated in the figures and described herein represent example embodiments of these methods. These methods may be implemented in software, hardware, or a combination thereof, in different embodiments. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A computer-implemented method, comprising:
   receiving input defining a brush stroke made by a virtual brush in a digital painting application, the virtual brush being modeled using a brush model that comprises a reservoir buffer and a pickup buffer;
   obtaining values for one or more of a drying rate parameter, a canvas wetness parameter, or a pickup mix ratio, the value of the drying rate parameter reflects a rate at which virtual paint dries on the virtual brush and affects a length of one or more brush strokes applied to a digital canvas using the virtual brush, the value of the canvas wetness parameter affects an amount of virtual paint picked up from a digital canvas by the virtual brush during one or more brush strokes, and the value of the pickup mix ratio affects whether virtual paint picked up from a digital canvas by the virtual brush during a brush stroke is mixed with other virtual paint on the virtual brush when being re-deposited on the digital canvas during the brush stroke;
   applying the brush stroke to concurrently deposit virtual paint from both the reservoir buffer and the pickup buffer of the virtual brush, independent of each other, to an image on a digital canvas such that at least some of the virtual paint from the reservoir buffer that is deposited concurrently with the virtual paint from the pickup buffer is deposited to the image without loading the at least some virtual paint from the reservoir buffer into the pickup buffer, effects of the brush stroke on the image are dependent on the one or more obtained values; and
   storing data representing the image as modified by the brush stroke.

2. The computer-implemented method of claim 1, wherein the value of the pickup mix ratio indicates an amount of other paint on the virtual brush to be mixed with virtual paint picked up from the digital canvas when the virtual paint picked up from the digital canvas is re-deposited on the digital canvas during the brush stroke.

3. The computer-implemented method of claim 2, wherein:
   the reservoir buffer is configured to store data representing paint stored in a belly of a paintbrush and the pickup buffer is configured to store data representing paint that has been picked up by the paintbrush during one or more brush strokes; and
   more virtual paint from the reservoir buffer is mixed with the virtual paint picked up from the digital canvas when the pickup mix ratio value is high than when the pickup mix ratio value is low.

4. The computer-implemented method of claim 1, wherein a shorter brush stroke is produced when the drying rate value is high than when the drying rate value is low.

5. The computer-implemented method of claim 1, wherein more virtual paint is picked up from a digital canvas by the virtual brush during the brush stroke when the canvas wetness value is high than when the canvas wetness value is low.

6. The computer-implemented method of claim 1, wherein one or more of the obtained values is a default value for a given paint type.

7. The computer-implemented method of claim 1, wherein the value of one or more of the drying rate parameter, the canvas wetness parameter, or the pickup mix ratio is configurable by a user.

8. The computer-implemented method of claim 1, wherein:
   the brush model comprises a bristle brush model; and for two or more bristles of the bristle brush model, the values of one or more of the drying rate parameter, the canvas wetness parameter, or the pickup mix ratio are different.

9. A system, comprising: one or more processors; and a memory coupled to the one or more processors, the memory stores program instructions that when executed by the one or more processors are configured to cause the one or more processors to:
receive input defining a brush stroke made by a virtual brush in a digital painting application, the virtual brush being modeled using a brush model that comprises a reservoir buffer and a pickup buffer;
obtain values for one or more of a drying rate parameter, a canvas wetness parameter, or a pickup mix ratio, the value of the drying rate parameter affects a length of one or more brush strokes applied to a digital canvas using the virtual brush, the value of the canvas wetness parameter affects an amount of virtual paint picked up from a digital canvas by the virtual brush during one or more brush strokes, and the value of the pickup mix ratio affects whether virtual paint picked up from a digital canvas by the virtual brush during a brush stroke is mixed with other virtual paint on the virtual brush when being re-deposited on the digital canvas during the brush stroke;
apply the brush stroke to concurrently deposit virtual paint from both the reservoir buffer and the pickup buffer of the virtual brush, independent of each other, to an image on a digital canvas such that at least some of the virtual paint from the reservoir buffer that is deposited concurrently with the virtual paint from the pickup buffer is deposited to the image without loading the at least some virtual paint from the reservoir buffer into the pickup buffer, effects of the brush stroke on the image are dependent on the one or more obtained values; and
store data representing the image as modified by the brush stroke.

10. The system of claim 9, wherein the value of the pickup mix ratio indicates an amount of other paint on the virtual brush to be mixed with virtual paint picked up from the digital canvas when the virtual paint picked up from the digital canvas is re-deposited on the digital canvas during the brush stroke.

11. The system of claim 10, wherein:
the reservoir buffer stores data representing paint stored in a belly of a paintbrush and the pickup buffer stores data representing paint that has been picked up by the paintbrush during one or more brush strokes; and
more virtual paint from the reservoir buffer is mixed with the virtual paint picked up from the digital canvas when the pickup mix ratio value is high than when the pickup mix ratio value is low.

12. The system of claim 9, wherein a shorter brush stroke is produced when the drying rate value is high than when the drying rate value is low.

13. The system of claim 9, wherein more virtual paint is picked up from a digital canvas by the virtual brush during the brush stroke when the canvas wetness value is high than when the canvas wetness value is low.

14. The system of claim 9, wherein the value of one or more of the drying rate parameter, the canvas wetness parameter, or the pickup mix ratio is configurable by a user.

15. A computer-readable storage device storing program instructions that when executed on one or more computers are configured to cause the one or more computers to:
receive input defining a brush stroke made by a virtual brush in a digital painting application, the virtual brush being modeled using a brush model that comprises a reservoir buffer and a pickup buffer;
obtain values for one or more of a drying rate parameter, a canvas wetness parameter, or a pickup mix ratio, the value of the drying rate parameter reflects a rate at which virtual paint dries on the virtual brush and affects a length of one or more brush strokes applied to a digital canvas using the virtual brush, the value of the canvas wetness parameter affects an amount of virtual paint picked up from a digital canvas by the virtual brush during one or more brush strokes, and the value of the pickup mix ratio affects whether virtual paint picked up from a digital canvas by the virtual brush during a brush stroke is mixed with other virtual paint on the virtual brush when being re-deposited on the digital canvas during the brush stroke;
apply the brush stroke to concurrently deposit virtual paint from both the reservoir buffer and the pickup buffer of the virtual brush, independent of each other, to an image on a digital canvas such that at least some of the virtual paint from the reservoir buffer that is deposited concurrently with the virtual paint from the pickup buffer is deposited to the image without loading the at least some virtual paint from the reservoir buffer into the pickup buffer, effects of the brush stroke on the image are dependent on the one or more obtained values; and
store data representing the image as modified by the brush stroke.

16. The storage device of claim 15, wherein: the value of the pickup mix ratio indicates an amount of other paint on the virtual brush to be mixed with virtual paint picked up from the digital canvas when the virtual paint picked up from the digital canvas is re-deposited on the digital canvas during the brush stroke;
the reservoir buffer is configured to store data representing paint stored in a belly of a paintbrush and the pickup buffer is configured to store data representing paint that has been picked up by the paintbrush during one or more brush strokes; and
more virtual paint from the reservoir buffer is mixed with the virtual paint picked up from the digital canvas when the pickup mix ratio value is high than when the pickup mix ratio value is low.

17. The storage device of claim 15, wherein a shorter brush stroke is produced when the drying rate value is high than when the drying rate value is low.

18. The storage device of claim 15, wherein more virtual paint is picked up from a digital canvas by the virtual brush during the brush stroke when the canvas wetness value is high than when the canvas wetness value is low.

19. The storage device of claim 15, wherein the value of one or more of the drying rate parameter, the canvas wetness parameter, or the pickup mix ratio is configurable by a user.

* * * * *